(12) United States Patent
Smith

(10) Patent No.: US 12,034,696 B2
(45) Date of Patent: Jul. 9, 2024

(54) DYNAMIC BORDER GATEWAY PROTOCOL (BGP) HOST ROUTE GENERATION BASED ON DOMAIN NAME SYSTEM (DNS) RESOLUTION

(71) Applicant: Level 3 Communications, LLC, Broomfield, CO (US)

(72) Inventor: Darrell Smith, Lakewood, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 18/244,594

(22) Filed: Sep. 11, 2023

(65) Prior Publication Data

US 2023/0421529 A1    Dec. 28, 2023

Related U.S. Application Data

(63) Continuation of application No. 18/129,371, filed on Mar. 31, 2023, now Pat. No. 11,765,125, which is a continuation of application No. 17/537,049, filed on Nov. 29, 2021, now Pat. No. 11,621,941.

(60) Provisional application No. 63/236,341, filed on Aug. 24, 2021.

(51) Int. Cl.
*G06F 16/955* (2019.01)
*H04L 61/4511* (2022.01)
*H04L 61/5046* (2022.01)

(52) U.S. Cl.
CPC ...... *H04L 61/4511* (2022.05); *H04L 61/5046* (2022.05)

(58) Field of Classification Search
None
See application file for complete search history.

(56) References Cited

U.S. PATENT DOCUMENTS

| 7,908,337 | B2* | 3/2011 | Garcia-Luna-Aceves .................. H04L 12/18 709/227 |
|---|---|---|---|
| 11,038,745 | B1 | 6/2021 | Vasquez |
| 11,621,941 | B2 | 4/2023 | Smith |
| 11,711,399 | B2 | 7/2023 | Kona |
| 2014/0006577 | A1 | 1/2014 | Joe |
| 2017/0195220 | A1 | 7/2017 | Sivaraj |
| 2017/0346722 | A1 | 11/2017 | Smith et al. |
| 2018/0019968 | A1 | 1/2018 | Redekop |
| 2019/0132280 | A1* | 5/2019 | Meuninck ............. H04L 69/321 |
| 2020/0259917 | A1* | 8/2020 | Luft .................... H04L 65/1026 |
| 2020/0259920 | A1* | 8/2020 | Luft .................... H04L 61/5061 |

(Continued)

*Primary Examiner* — Christopher B Robinson

(57) ABSTRACT

Novel tools and techniques are provided for implementing dynamic border gateway protocol ("BGP") host route generation based on domain name system ("DNS") resolution. In various embodiments, a computing system may receive, from a user device via a first network, a request to establish a communications link with an external device via a second network that is separate from the first network, based on a first uniform resource identifier ("URI") indicative of a network location of the external device. The computing system may query a DNS resolver for an Internet Protocol ("IP") address corresponding to a valid current IP address, based on the first URI, and may advertise the IP address and/or a route based on the IP address. A communications link may be established between the user device and the external device based on the IP address and/or the route.

14 Claims, 11 Drawing Sheets

(56) References Cited

U.S. PATENT DOCUMENTS

| | | |
|---|---|---|
| 2020/0374321 A1 | 11/2020 | Sridhar |
| 2021/0067577 A1 | 3/2021 | Shribman |
| 2022/0263792 A1 | 8/2022 | Dodd-Nobel |
| 2023/0065919 A1 | 3/2023 | Smith |
| 2023/0275871 A1 | 8/2023 | Smith |

* cited by examiner

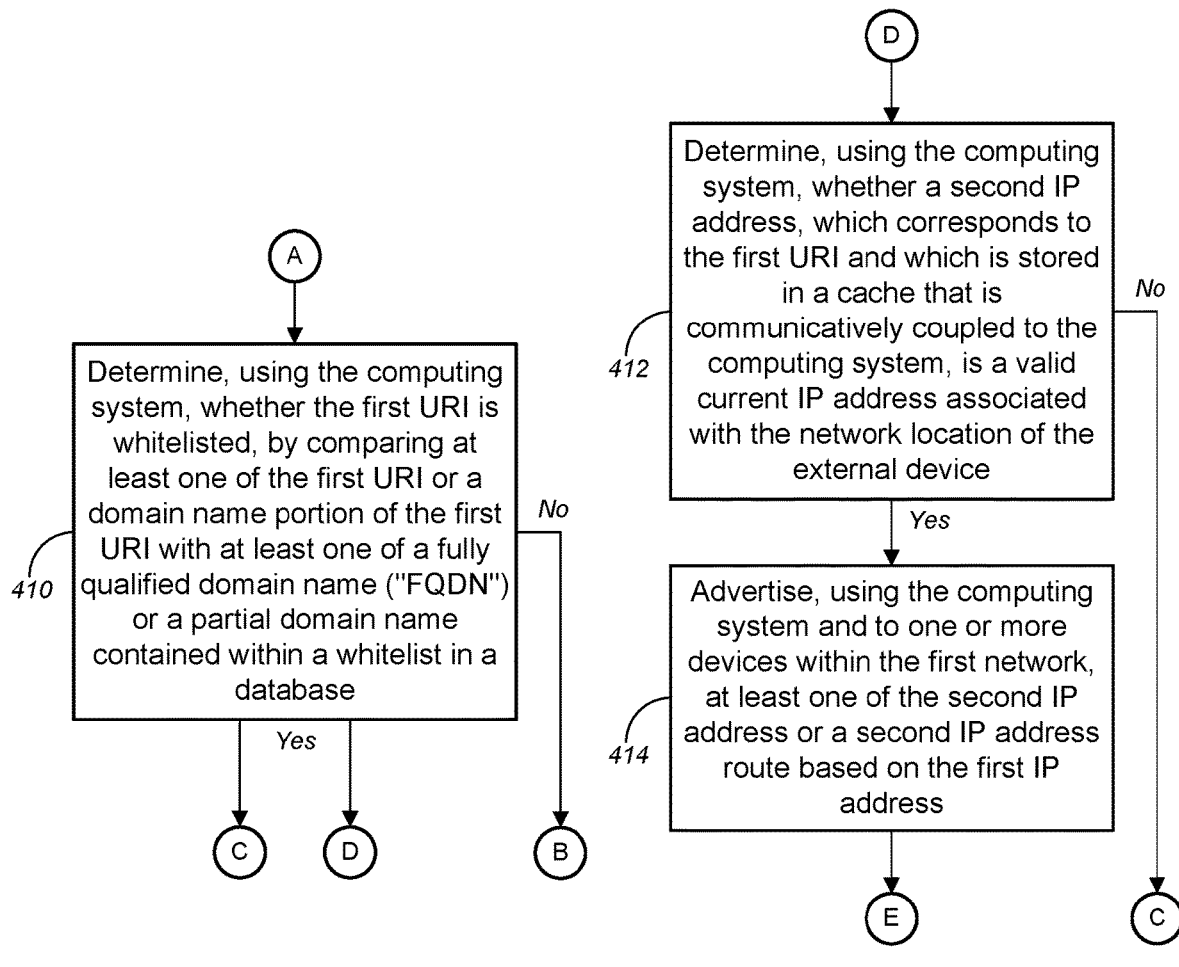

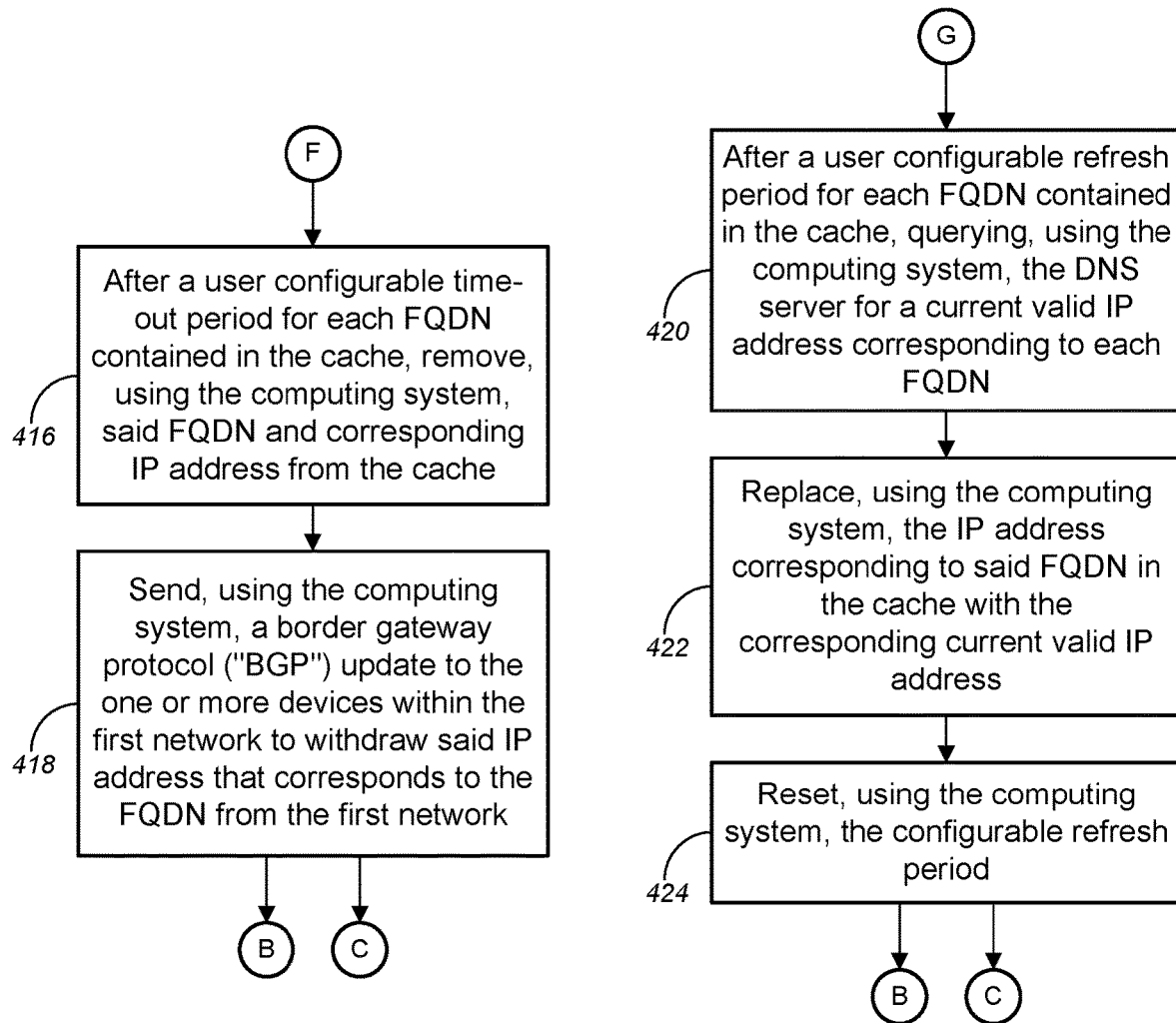

US 12,034,696 B2

DYNAMIC BORDER GATEWAY PROTOCOL (BGP) HOST ROUTE GENERATION BASED ON DOMAIN NAME SYSTEM (DNS) RESOLUTION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network routing, and, more particularly, to methods, systems, and apparatuses for implementing dynamic border gateway protocol ("BGP") host route generation based on domain name system ("DNS") resolution.

BACKGROUND

Increasingly, software and/or hardware vendors are programming "phone home" capabilities into end nodes that are disposed in customer private networks for various reasons, such as reaching external devices including licensing servers, software update servers, etc., that are disposed in external networks. However, for customer private networks that do not have actual Internet connectivity to the external devices, conventional systems and networks rely on conventional proxy DNS techniques for reaching the external devices via default routes. However, such "phone home" attempts would fail if the default routes fail, if the IP address associated with the external devices change, and/or if the external devices are dependent on geographical location (which routes to different IP addresses depending on the geographical location of the end nodes).

Hence, there is a need for more robust and scalable solutions for implementing network routing, and, more particularly, to methods, systems, and apparatuses for implementing dynamic border gateway protocol ("BGP") host route generation based on domain name system ("DNS") resolution.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4F are flow diagrams illustrating a method for implementing dynamic BGP host route generation based on DNS resolution, in accordance with various embodiments.

DETAILED DESCRIPTION OF CERTAIN EMBODIMENTS

Overview

Figure 1:
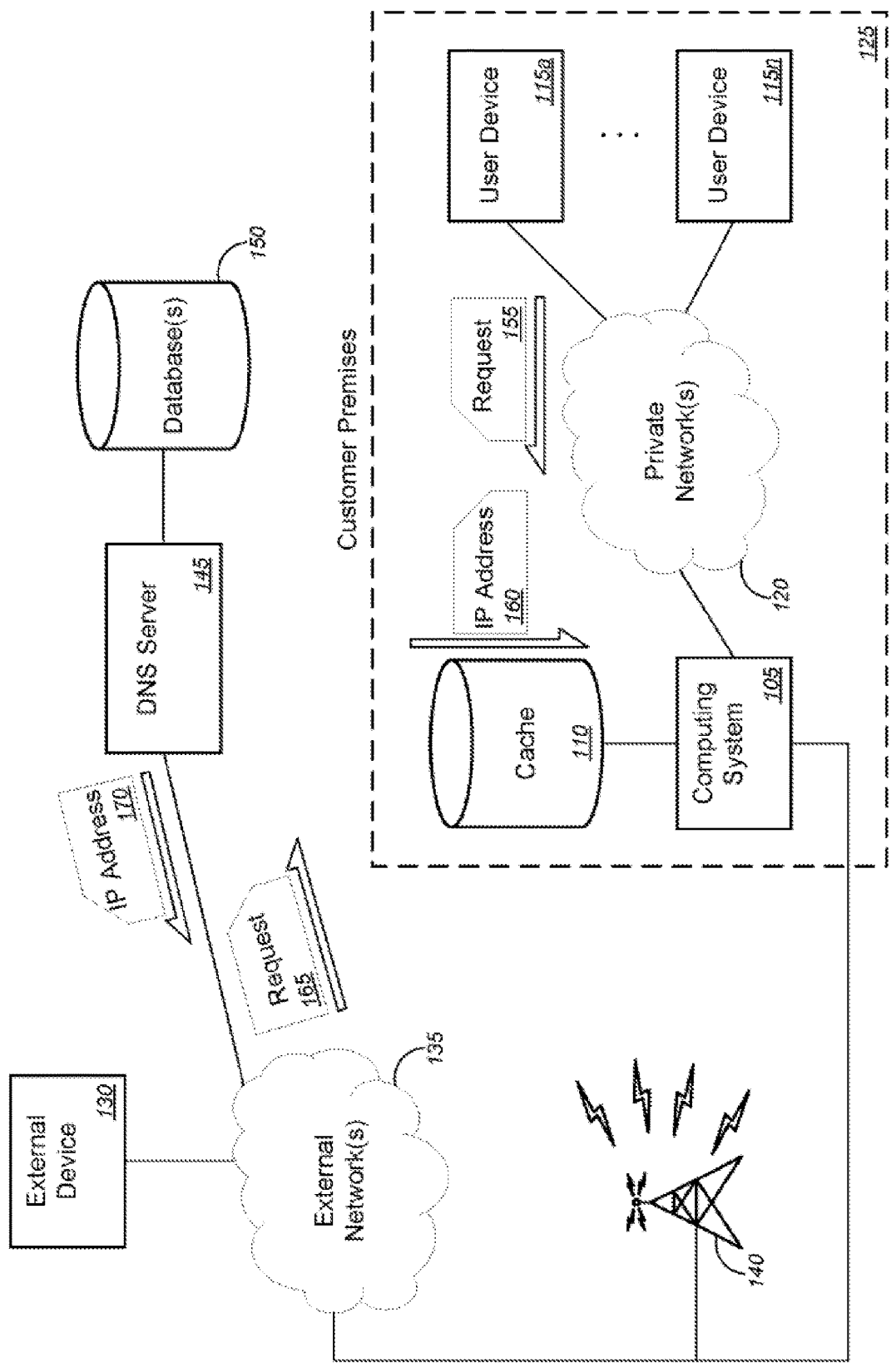
FIG. 1 is a schematic diagram illustrating a system for implementing dynamic border gateway protocol ("BGP") host route generation based on domain name system ("DNS") resolution, in accordance with various embodiments.

Various embodiments provide tools and techniques for implementing network routing, and, more particularly, to methods, systems, and apparatuses for implementing dynamic border gateway protocol ("BGP") host route generation based on domain name system ("DNS") resolution.

In various embodiments, a computing system may receive, from a user device via a first network, a request to establish a communications link with an external device via a second network that is separate from the first network, the request comprising a first uniform resource identifier ("URI") indicative of a network location of the external device. The computing system may query a DNS server or resolver for a first Internet Protocol ("IP") address corresponding to a valid current IP address associated with the network location of the external device, based on the first URI, e.g., by sending a request. In some embodiments, querying the DNS server for the first IP address may comprise one of continuously, periodically, randomly, or reactively querying the DNS server for the first IP address corresponding to the valid current IP address associated with the network location of the external device.

The computing system may then advertise, to one or more devices within the first network (including the user device), at least one of the first IP address or a first IP address route based on the first IP address. According to some embodiments, advertising the at least one of the first IP address or the first IP address route based on the first IP address may comprise advertising, to the one or more devices within the first network, at least one of the first IP address or the first IP address route based on the first IP address, using BGP or the like. In some instances, querying the DNS and advertising the at least one of the first IP address or the first IP address route may be performed in real-time or near-real-time. The computing system and/or the second network (or nodes, routers, or switches therein) may subsequently establish a communications link between the user device and the external device based on the at least one of the first IP address or the first IP address route (which may be determined by the computing system and/or the second network (or nodes, routers, or switches therein), or the like).

In some embodiments, in response to receiving the request, from the user device, to establish a communications link with an external device, the computing system may determine whether the first URI is whitelisted, in some cases, by comparing at least one of the first URI or a domain name portion of the first URI with at least one of a fully qualified domain name ("FQDN") or a partial domain name contained within a whitelist in a database. In such embodiments, querying the DNS server for the first IP address corresponding to a valid current IP address associated with the network location of the external device, based on the first URI, may be only performed based on a determination that the first URI is whitelisted.

Alternatively, or additionally, in response to receiving the request to establish a communications link with the external device via the second network, the computing system may determine whether a second IP address, which corresponds to the first URI and which is stored in a cache that is communicatively coupled to the computing system, is a valid current IP address associated with the network location of the external device. Based on a determination that the second IP address is a valid current IP address associated with the network location of the external device, the computing system may advertise, to the one or more devices within the first network, at least one of the second IP address or a second IP address route based on the first IP address. In such embodiments, querying the DNS server for the first IP address corresponding to a valid current IP address associated with the network location of the external device, based on the first URI, may be performed based on a determination that the second IP address is not a valid current IP address associated with the network location of the external device. According to some embodiments, the cache may store a plurality of FQDNs and corresponding IP addresses, and, in one or more particular embodiments, all said corresponding IP addresses may be advertised into the first network.

Alternatively, or additionally, the cache may be updated any time a new DNS request is made, regardless of the time-out period, the refresh period, or the like.

In some aspects, a device (e.g., a router or firewall, or the like) may periodically query a DNS server to resolve DNS host name(s) into IP addresses. The resulting IP address route(s) may dynamically advertise by BGP into a private network containing other hosts. This provides IP routing reachability for hosts within the private network to reach the user specified host name(s) which is(are) not in the private network. BGP may then advertise the most current or correct IP address associated with the particular user specified DNS host name(s). When a DNS change is made that affects the IP address of the user specified host name(s), the BGP process, via route advertisement update, may begin advertising the 'new/updated' IP address route associated with the host name(s), in near real-time.

In the various embodiments, dynamic BGP host route generation based on DNS resolution may provide optimized routing to an external device associated with a third party over an external network(s) that may be performed regardless of whether or not the external device has general access to the external network(s), whether the third party has changed the IP address associated with the third party external device, and whether the IP address associated with the third party external device is dependent on geographical location.

These and other aspects of the dynamic BGP host route generation based on DNS resolution are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network routing technology, domain name system ("DNS") resolution technology, DNS proxy technology, border gateway protocol ("BGP") host route generation technology, and/or the like. In other aspects, certain embodiments, can improve the functioning of user equipment or systems themselves (e.g., network routing systems, DNS resolution systems, DNS proxy systems, BGP host route generation systems, etc.), for example, by receiving, using a computing system and from a user device via a first network, a request to establish a communications link with an external device via a second network that is separate from the first network, the request comprising a first uniform resource identifier ("URI") indicative of a network location of the external device; and querying, using the computing system, a DNS server for a first Internet Protocol ("IP") address corresponding to a valid current IP address associated with the network location of the external device, based on the first URI, and advertising, using the computing system and to one or more devices within the first network, at least one of the first IP address or a first IP address route based on the first IP address, wherein the one or more devices within the first network comprise the user device; wherein a communications link is established between the user device and the external device based on the at least one of the first IP address or the first IP address route; and/or the like.

In particular, to the extent any abstract concepts are present in the various embodiments, those concepts can be implemented as described herein by devices, software, systems, and methods that involve specific novel functionality (e.g., steps or operations), such as, querying, using the computing system, the DNS server for the first IP address corresponding to a valid current IP address associated with the network location of the external device, based on the first URI, and advertising, using the computing system and to one or more devices (including the user device) within the first network, at least one of the first IP address or the first IP address route based on the first IP address, and/or the like, to name a few examples, that extend beyond mere conventional computer processing operations. These functionalities can produce tangible results outside of the implementing computer system, including, merely by way of example, optimized routing to an external device associated with a third party over an external network(s) that may be performed regardless of whether or not the external device has general access to the external network(s), whether the third party has changed the IP address associated with the third party external device, and whether the IP address associated with the third party external device is dependent on geographical location, and/or the like, at least some of which may be observed or measured by customers and/or service providers.

In an aspect, a method may comprise: receiving, using a computing system and from a user device via a private network, a request to establish a communications link with an external device via an external network that is separate from the private network, the request comprising a first uniform resource identifier ("URI") indicative of a network location of the external device; determining, using the computing system, whether a first Internet Protocol ("IP") address, which corresponds to the first URI and which is stored in a cache that is communicatively coupled to the computing system, is a valid current IP address associated with the network location of the external device; based on a determination that the first IP address is a valid current IP address associated with the network location of the external device, advertising, using the computing system and to one or more devices within the private network, at least one of the first IP address or a first IP address route based on the first IP address, wherein the one or more devices within the private network comprise the user device; and based on a determination that the first IP address is not a valid current IP address associated with the network location of the external device, querying, using the computing system, a domain name system ("DNS") server for a second IP address corresponding to a valid current IP address associated with the network location of the external device, based on the first URI, and advertising, using the computing system and to one or more devices within the private network, at least one of the second IP address or a second IP address route based on the second IP address; wherein a communications link is established between the user device and the external device based on one of the at least one of the first IP address or the first IP address route or the at least one of the second IP address or the second IP address route.

In another aspect, a method may comprise: receiving, using a computing system and from a user device via a first network, a request to establish a communications link with an external device via a second network that is separate from the first network, the request comprising a first uniform resource identifier ("URI") indicative of a network location of the external device; and querying, using the computing system, a domain name system ("DNS") server for a first Internet Protocol ("IP") address corresponding to a valid current IP address associated with the network location of the external device, based on the first URI, and advertising, using the computing system and to one or more devices within the first network, at least one of the first IP address or a first IP address route based on the first IP address, wherein the one or more devices within the first network comprise the user device; wherein a communications link is established between the user device and the external device based on the at least one of the first IP address or the first IP address route.

In some embodiments, the computing system may comprise at least one of a firewall device, a router device, a gateway device, a network interface device, an optical network terminal, or customer premises equipment, and/or the like.

According to some embodiments, querying the DNS server for the first IP address may comprise one of continuously, periodically, randomly, or reactively querying, using the computing system, the DNS server for the first IP address corresponding to the valid current IP address associated with the network location of the external device. In some cases, advertising the at least one of the first IP address or the first IP address route based on the first IP address may comprise advertising, using the computing system and to the one or more devices within the first network, at least one of the first IP address or the first IP address route based on the first IP address, using border gateway protocol ("BGP"). In some instances, querying the DNS and advertising the at least one of the first IP address or the first IP address route may be performed in real-time or near-real-time.

In some embodiments, the method may further comprise, in response to receiving the request, from the user device, to establish a communications link with an external device, determining, using the computing system, whether the first URI is whitelisted, by comparing at least one of the first URI or a domain name portion of the first URI with at least one of a fully qualified domain name ("FQDN") or a partial domain name contained within a whitelist in a database. In some instances, querying the DNS server for the first IP address corresponding to a valid current IP address associated with the network location of the external device, based on the first URI, may only be performed based on a determination that the first URI is whitelisted.

According to some embodiments, the method may further comprise, in response to receiving the request to establish a communications link with the external device via the second network, determining, using the computing system, whether a second IP address, which corresponds to the first URI and which is stored in a cache that is communicatively coupled to the computing system, is a valid current IP address associated with the network location of the external device; and, based on a determination that the second IP address is a valid current IP address associated with the network location of the external device, advertising, using the computing system and to one or more devices within the first network, at least one of the second IP address or a second IP address route based on the first IP address. In some cases, querying the DNS server for the first IP address corresponding to a valid current IP address associated with the network location of the external device, based on the first URI, may be performed based on a determination that the second IP address is not a valid current IP address associated with the network location of the external device. In some instances, the cache may store a plurality of fully qualified domain names ("FQDNs") and corresponding IP addresses, wherein all said corresponding IP addresses are advertised into the first network.

In some cases, the method may further comprise, after a user configurable time-out period for each FQDN contained in the cache, removing, using the computing system, said FQDN and corresponding IP address from the cache, and sending, using the computing system, a border gateway protocol ("BGP") update to the one or more devices within the first network to withdraw said IP address that corresponds to the FQDN from the first network, wherein the configurable time-out period may be reset when a FQDN and corresponding IP address is added or updated in the cache. In some instances, the method may further comprise, after a user configurable refresh period for each FQDN contained in the cache, querying, using the computing system, the DNS server for a current valid IP address corresponding to each FQDN, replacing, using the computing system, the IP address corresponding to said FQDN in the cache with the corresponding current valid IP address, and resetting, using the computing system, the configurable refresh period.

In some embodiments, the method may further comprise performing a cache update, comprising: querying, using the computing system, the DNS server for a third IP address, based on the first URI; determining, using the computing system, whether the third IP address matches a fourth IP address corresponding to the first URI that is contained in a cache; based on a determination that the third IP address obtained from the DNS server matches the fourth IP address that is contained in the cache, resetting, using the computing system, a time-out period for the fourth IP address, and sending, using the computing system, the third or fourth IP address to the user device via the first network; and based on a determination that the third IP address obtained from the DNS server is different from the fourth IP address contained in the cache, updating, using the computing system, the cache with the third IP address by replacing the fourth IP address with the third IP address, resetting, using the computing system, the time-out period for the third IP address, sending, using the computing system, the third IP address to the user device via the first network, and sending, using the computing system, a border gateway protocol ("BGP") update to the one or more devices within the first network to withdraw the fourth IP address from the first network.

According to some embodiments, querying the DNS server for the first IP address corresponding to a valid current IP address associated with the network location of the external device, based on the first URI, may be performed based on one of: a requirement for a third party device embodied by the user device to maintain a licensed state by periodically phoning home to a third party licensing server embodied by the external device, wherein the third party device and the third party licensing server are associated with a third party, wherein querying the DNS server and establishing the communications link between the user device and the external device are performed regardless of whether or not the third party device has general access to the second network, whether the third party has changed the IP address associated with the third party licensing server, or whether the IP address associated with the third party licensing server is dependent on geographical location; a requirement for a software defined wide area network ("SD-WAN") customer premises equipment ("CPE") embodied by the user device to initialize by phoning home at time of CPE setup or to periodically phone home to a SD-WAN controller embodied by the external device to perform a zero touch provisioning ("ZTP") function, wherein querying the DNS server and establishing the communications link between the user device and the external device are performed regardless of whether or not the SD-WAN CPE has general access to the second network, whether a service provider has changed the IP address associated with the SD-WAN controller, or whether the IP address associated with the SD-WAN controller is dependent on geographical location; or a requirement for a voice over IP ("VoIP") device embodied by the user device to continuously connect to a VoIP session border controller ("SBC") embodied by the external device to offer VoIP services to a customer, wherein querying the DNS server and establishing the communications link between the user device and the external device are performed regardless of whether or not the VoIP device has general access to the second network, whether a service provider has changed the IP address associated with the VoIP SBC, or whether the IP address associated with the VoIP SBC is dependent on geographical location. In some instances, for the user device without general access to the second network, the computing system may provide the user device with access to the external device, via the second network, only to IP addresses or IP address routes advertised into the first network by the computing system.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a user device via a first network, a request to establish a communications link with an external device via a second network that is separate from the first network, the request comprising a first uniform resource identifier ("URI") indicative of a network location of the external device; and query a domain name system ("DNS") server for a first Internet Protocol ("IP") address corresponding to a valid current IP address associated with the network location of the external device, based on the first URI, and advertise, to one or more devices within the first network, at least one of the first IP address or a first IP address route based on the first IP address, wherein the one or more devices within the first network comprise the user device; wherein a communications link is established between the user device and the external device based on the at least one of the first IP address or the first IP address route.

In some embodiments, the computing system may comprise at least one of a firewall device, a router device, a gateway device, a network interface device, an optical network terminal, or customer premises equipment, and/or the like. In some instances, querying the DNS server for the first IP address may comprise one of continuously, periodically, randomly, or reactively querying, using the computing system, the DNS server for the first IP address corresponding to the valid current IP address associated with the network location of the external device. In some cases, querying the DNS and advertising the at least one of the first IP address or the first IP address route may be performed in real-time or near-real-time.

According to some embodiments, querying the DNS server for the first IP address corresponding to a valid current IP address associated with the network location of the external device, based on the first URI, may be performed based on one of: a requirement for a third party device embodied by the user device to maintain a licensed state by periodically phoning home to a third party licensing server embodied by the external device, wherein the third party device and the third party licensing server are associated with a third party, wherein querying the DNS server and establishing the communications link between the user device and the external device are performed regardless of whether or not the third party device has general access to the second network or whether the third party has changed the IP address associated with the third party licensing server; a requirement for a software defined wide area network ("SD-WAN") customer premises equipment ("CPE") embodied by the user device to initialize by phoning home at time of CPE setup to a SD-WAN controller embodied by the external device to perform a zero touch provisioning ("ZTP") function, wherein querying the DNS server and establishing the communications link between the user device and the external device are performed regardless of whether or not the SD-WAN CPE has general access to the second network or whether a service provider has changed the IP address associated with the SD-WAN controller; or a requirement for a voice over IP ("VoIP") device embodied by the user device to continuously connect to a VoIP session border controller ("SBC") embodied by the external device to offer VoIP services to a customer, wherein querying the DNS server and establishing the communications link between the user device and the external device are performed regardless of whether or not the VoIP device has general access to the second network or whether a service provider has changed the IP address associated with the VoIP SBC. In some cases, for the user device without general access to the second network, the computing system may provide the user device with access to the external device, via the second network, only to IP addresses or IP address routes advertised into the first network by the computing system.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing network routing, and, more particularly, to methods, systems, and apparatuses for implementing dynamic border gateway protocol ("BGP") host route generation based on domain name system ("DNS") resolution, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing dynamic border gateway protocol ("BGP") host route generation based on domain name system ("DNS") resolution, in accordance with various embodiments.

In the non-limiting embodiment of FIG. 1, system 100 might comprise a computing system 105 and a cache 110 (or data store or database) that is local to the computing system 105. In some cases, the cache 110 might be external, yet communicatively coupled, to the computing system 105. In other cases, the cache 110 might be integrated within the computing system 105. System 100, according to some embodiments, might further comprise one or more user devices 115a-115n (collectively, "user devices 115" or the like) and private network(s) 120. In some instances, the computing system may include, without limitation, at least one of a firewall device, a router device, a gateway device, a network interface device, an optical network terminal, or customer premises equipment ("CPE"), and/or the like. In some cases, the user devices 115 may each include, but is not limited to, at least one of a CPE, a software defined wide area network ("SD-WAN") CPE, a third party device, a voice over Internet Protocol ("VoIP") device, and/or the like. The computing system 105, the cache 110, the user devices 115, and the private network(s) 120 may be disposed or located within customer premises 125, which may include, but is not limited to, one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some instances, the private network(s) 120 may each include, without limitation, one of a local area network ("LAN"), including, without limitation, a fiber network, an Ethernet network, a Token-Ring™ network, and/or the like; an intranet; an infra-red network; a wireless network, including, without limitation, a network operating under any of the IEEE 802.11 suite of protocols, the Bluetooth™ protocol known in the art, and/or any other wireless protocol; and/or any combination of these and/or other networks.

System 100 may further comprise an external device 130, which may include, but is not limited to, one of software update server, a management server, a licensing server (e.g., a licensing server associated with the service provider of the external network(s), a third party licensing server, or the like), a SD-WAN controller, or a VoIP session border controller ("SBC"), and/or the like. The external device 130 may communicatively couple with computing system 105 via external network(s) 135 (and, in some cases, via one or more telecommunications relay systems 140, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 140 and the computing system 105. System 100 may further comprise a domain name system ("DNS") server or resolver 145 and corresponding database(s) 150. The DNS server 145, similar to the external device 130, may communicatively couple with computing system 105 via external network(s) 135 (and, in some cases, via the one or more telecommunications relay systems 140).

According to some embodiments, the external network(s) 135 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 115 may include an access network of the service provider (e.g., an Internet service provider ("ISP")). In another embodiment, the network(s) 115 may include a core network of the service provider and/or the Internet.

In operation, a computing system (e.g., computing system 105, or the like) may receive, from a user device (e.g., one of user devices 115, or the like) via a first network (e.g., private network(s) 120, or the like), a request (e.g., request 155, or the like) to establish a communications link with an external device (e.g., external device 130, or the like) via a second network (e.g., external network(s) 135, or the like) that is separate from the first network, the request comprising a first uniform resource identifier ("URI") indicative of a network location of the external device. The computing system may query a DNS server or resolver (e.g., DNS server 145, or the like) for a first Internet Protocol ("IP") address (e.g., IP address 170, or the like) corresponding to a valid current IP address associated with the network location of the external device, based on the first URI, e.g., by sending a request (e.g., request 165, which is either a forwarded request 155 or a request similar to request 155 or based on request 155, or the like). In some embodiments, querying the DNS server for the first IP address may comprise one of continuously, periodically, randomly, or reactively querying the DNS server for the first IP address corresponding to the valid current IP address associated with the network location of the external device.

The computing system may then advertise, to one or more devices within the first network (including the user device), at least one of the first IP address or a first IP address route based on the first IP address. According to some embodiments, advertising the at least one of the first IP address or the first IP address route based on the first IP address may comprise advertising, to the one or more devices within the first network, at least one of the first IP address or the first IP address route based on the first IP address, using border gateway protocol ("BGP") or the like [also referred to as "BGP Advertisement" or the like]. In some instances, querying the DNS and advertising the at least one of the first IP address or the first IP address route may be performed in real-time or near-real-time. The computing system and/or the second network (or nodes, routers, or switches therein) may subsequently establish a communications link between the user device and the external device based on the at least one of the first IP address or the first IP address route (which may be determined by the computing system and/or the second network (or nodes, routers, or switches therein), or the like).

In some embodiments, in response to receiving the request, from the user device, to establish a communications link with an external device, the computing system may determine whether the first URI is whitelisted, in some cases, by comparing at least one of the first URI or a domain name portion of the first URI with at least one of a fully qualified domain name ("FQDN") or a partial domain name contained within a whitelist in a database (e.g., cache 110, or other database(s) (not shown), or the like). In such embodiments, querying the DNS server for the first IP address corresponding to a valid current IP address associated with the network location of the external device, based on the first URI, may be only performed based on a determination that the first URI is whitelisted.

Alternatively, or additionally, in response to receiving the request to establish a communications link with the external device via the second network, the computing system may determine whether a second IP address, which corresponds to the first URI and which is stored in a cache (e.g., cache 110, or the like) that is communicatively coupled to the computing system, is a valid current IP address associated with the network location of the external device. Based on a determination that the second IP address (e.g., IP address 160, or the like) is a valid current IP address associated with the network location of the external device, the computing system may advertise, to the one or more devices within the first network, at least one of the second IP address or a second IP address route based on the first IP address. In such embodiments, querying the DNS server for the first IP address corresponding to a valid current IP address associated with the network location of the external device, based on the first URI, may be performed based on a determination that the second IP address is not a valid current IP address associated with the network location of the external device. According to some embodiments, the cache may store a plurality of FQDNs and corresponding IP addresses, and, in one or more particular embodiments, all said corresponding IP addresses may be advertised into the first network.

Alternatively, or additionally, after a user configurable time-out period for each FQDN contained in the cache, the computing system may remove said FQDN and corresponding IP address from the cache, and may send a BGP update to the one or more devices within the first network to withdraw said IP address that corresponds to the FQDN from the first network [also referred to as "BGP Update" or "BGP Withdrawal" or the like]. In such cases, the configurable time-out period may be reset when a FQDN and corresponding IP address is added or updated in the cache, or the like. In some embodiments, the configurable time-out period may be configured by a user or a customer to be any suitable time-out period, including, but not limited to, 1, 2, 3, 4, 5, 10, 20, 25, 30, 35, 40, 45, 50, or 55 minutes or a range of 1-60 minutes, or 1, 2, 3, 4, 5, 6, 11, 12, 15, 18, 21, 24, 30, 36, 42, or 48 hours, or a range of 1-48 hours, or 1, 2, 3, 4, 6, 7 days, or a range of 1-7 days, or any suitable combination of days, hours, minutes, or the like. Thus, the time-out period may represent (based on user configuration) how long a previously obtained FQDN and corresponding IP address is deemed valid (or trustworthy), before it is deleted or removed from the cache.

Alternatively, or additionally, after a user configurable refresh period for each FQDN contained in the cache, the computing system may query the DNS server for a current valid IP address corresponding to each FQDN, may replace the IP address corresponding to said FQDN in the cache with the corresponding current valid IP address, and may reset the configurable refresh period. In some embodiments, the configurable refresh period may be configured by a user or a customer to be any suitable refresh period, including, but not limited to, 1, 2, 3, 4, 5, 10, 15, 20, 25, 30, 35, 40, 45, or 55 minutes or a range of 1-60 minutes, or 1, 2, 3, 4, 5, 6, 10, 11, 12, 15, 18, 21, 24, 36, 42, or 48 hours, or a range of 1-48 hours, or 1, 2, 3, 4, 5, 6, 7 days, or a range of 1-7 days, or any suitable combination of days, hours, minutes, or the like. Thus, the refresh period may represent (based on user configuration) how often the DNS server should be queried for an up-to-date or valid current IP address corresponding to the FQDN to replace the FQDN and corresponding IP address stored in the cache (regardless of whether or not the user device actively attempts to "phone home" to the external device, and regardless of the time-out period, or the like).

Alternatively, or additionally, the cache may be updated any time a new DNS request is made, regardless of the time-out period, the refresh period, or the like.

Alternatively, or additionally, the computing system may perform a cache update, which may comprise: querying the DNS server for a third IP address, based on the first URI; determining whether the third IP address matches a fourth IP address corresponding to the first URI that is contained in a cache; based on a determination that the third IP address obtained from the DNS server matches the fourth IP address that is contained in the cache, resetting a time-out period for the fourth IP address, and sending the third or fourth IP address to the user device via the first network; and based on a determination that the third IP address obtained from the DNS server is different from the fourth IP address contained in the cache, updating the cache with the third IP address by replacing the fourth IP address with the third IP address, resetting the time-out period for the third IP address, sending the third IP address to the user device via the first network, and sending a BGP update to the one or more devices within the first network to withdraw the fourth IP address from the first network.

Merely by way of example, in some cases, querying the DNS server for the first IP address corresponding to a valid current IP address associated with the network location of the external device, based on the first URI, may be performed based on a requirement for a third party device embodied by the user device to maintain a licensed state by periodically "phoning home" to a third party licensing server embodied by the external device (such as shown and described below with respect to FIG. 3A, or the like). In some cases, the third party device and the third party licensing server may be associated with a third party. In some instances, querying the DNS server and establishing the communications link between the user device and the external device may be performed regardless of whether or not the third party device has general access to the second network, whether the third party has changed the IP address associated with the third party licensing server, or whether the IP address associated with the third party licensing server is dependent on geographical location, and/or the like.

Figure 3A:
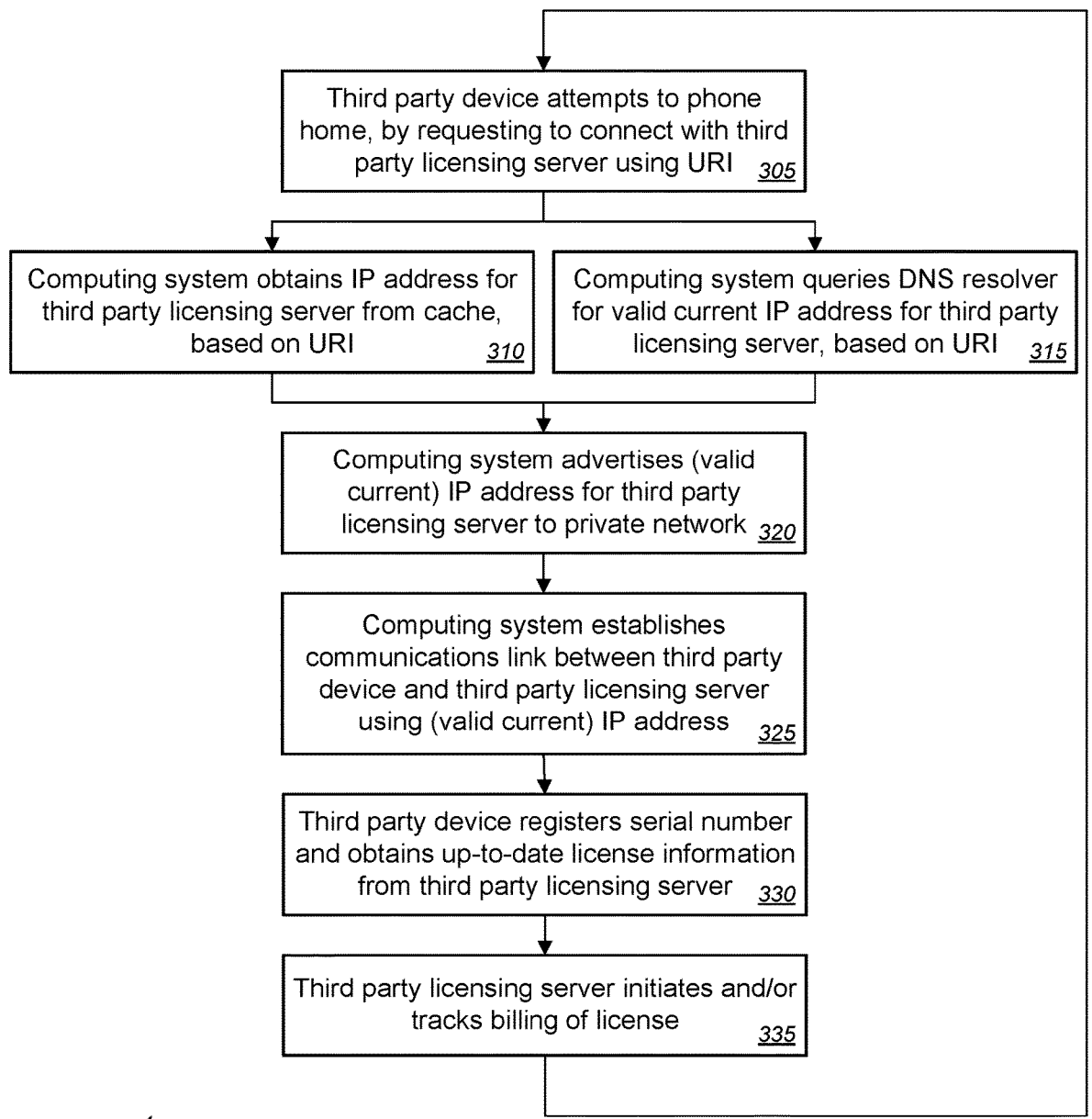
FIGS. 3A-3C is a schematic diagram illustrating various non-limiting examples of use cases for which dynamic BGP host route generation based on DNS resolution may be implemented, in accordance with various embodiments.

Alternatively, querying the DNS server for the first IP address corresponding to a valid current IP address associated with the network location of the external device, based on the first URI, may be performed based on a requirement for a SD-WAN CPE embodied by the user device to initialize by phoning home at time of CPE setup or to periodically "phone home" to a SD-WAN controller embodied by the external device to perform a zero touch provisioning ("ZTP") function (such as shown and described below with respect to FIG. 3A, or the like). In some cases, querying the DNS server and establishing the communications link between the user device and the external device may be performed regardless of whether or not the SD-WAN CPE has general access to the second network, whether a service provider has changed the IP address associated with the SD-WAN controller, or whether the IP address associated with the SD-WAN controller is dependent on geographical location, and/or the like.

In yet another alternative embodiment, querying the DNS server for the first IP address corresponding to a valid current IP address associated with the network location of the external device, based on the first URI, may be performed based on a requirement for a VoIP device embodied by the user device to continuously connect to a VoIP SBC embodied by the external device to offer VoIP services to a customer (such as shown and described below with respect to FIG. 3C, or the like). In some cases, querying the DNS server and establishing the communications link between the user device and the external device may be performed regardless of whether or not the VoIP device has general access to the second network, whether a service provider has changed the IP address associated with the VoIP SBC, or whether the IP address associated with the VoIP SBC is dependent on geographical location, and/or the like.

According to some embodiments, for the user device(s) without general access to the second network, the computing system may provide the user device with access to the external device, via the second network, only to IP addresses or IP address routes advertised into the first network by the computing system.

These and other functions of the system 100 (and its components) are described in greater detail below with respect to FIGS. 2-4.

Figure 2:
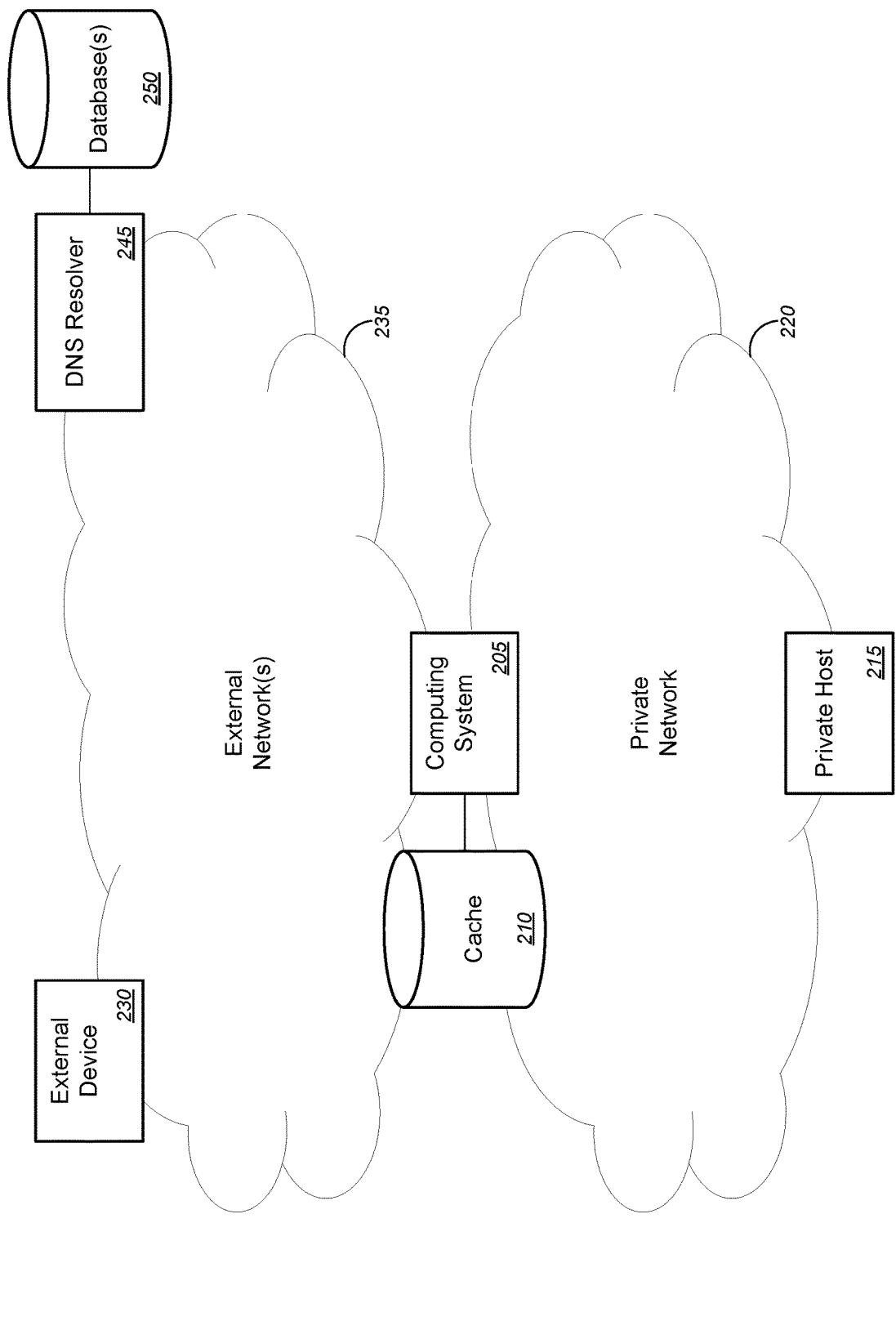
FIG. 2 is a schematic diagram illustrating a non-limiting example of system interconnection of components for implementing dynamic BGP host route generation based on DNS resolution, in accordance with various embodiments.

FIG. 2 is a schematic diagram illustrating a non-limiting example 200 of system interconnection of components for implementing dynamic BGP host route generation based on DNS resolution, in accordance with various embodiments.

With reference to the non-limiting embodiment 200 of FIG. 2, computing system 205 (which may communicatively couple with cache 210) may communicatively couple with a private host 215 via private network 220 and may communicatively couple with an external device 230 via external network(s) 235. Computing system 205 may communicatively couple with domain name system ("DNS") resolver 245 and corresponding database(s) 250 via external network(s) 235.

In operation, a computing system (e.g., computing system 205, or the like) may receive, from a user device (e.g., private host 215, or the like) via a private network (e.g., private network 220, or the like), a request to establish a communications link with an external device (e.g., external device 230, or the like) via an external network (e.g., external network(s) 235, or the like) that is separate from the private network, the request comprising a first uniform resource identifier ("URI") indicative of a network location of the external device. The computing system may determine whether a first Internet Protocol ("IP") address, which corresponds to the first URI and which is stored in a cache that is communicatively coupled to the computing system, is a valid current IP address associated with the network location of the external device. Based on a determination that the first IP address is a valid current IP address associated with the network location of the external device, the computing system may advertise, to one or more devices within the private network, at least one of the first IP address or a first IP address route based on the first IP address. The one or more devices within the private network may comprise the user device. Based on a determination that the first IP address is not a valid current IP address associated with the network location of the external device, the computing system may query a DNS server (e.g., DNS resolver 245, or the like) for a second IP address corresponding to a valid current IP address associated with the network location of the external device, based on the first URI, and may advertise, to one or more devices within the private network, at least one of the second IP address or a second IP address route based on the second IP address. A communications link may be established between the user device and the external device based on one of the at least one of the first IP address or the first IP address route or the at least one of the second IP address or the second IP address route.

Computing system 205, cache 210, private host 215, private network 220, external device 230, external network(s) 235, DNS resolver 245, and database(s) 250 are otherwise similar, if not identical, to the computing system 105, the cache 110, the user devices 115, the private network(s) 120, the external device 130, the external network(s) 135, the DNS resolver 145, and the database(s) 150, respectively, of system 100 in FIG. 1, and the descriptions of these components of system 100 (and their functions) are applicable to the corresponding components of system 200, respectively.

Figure 3B:
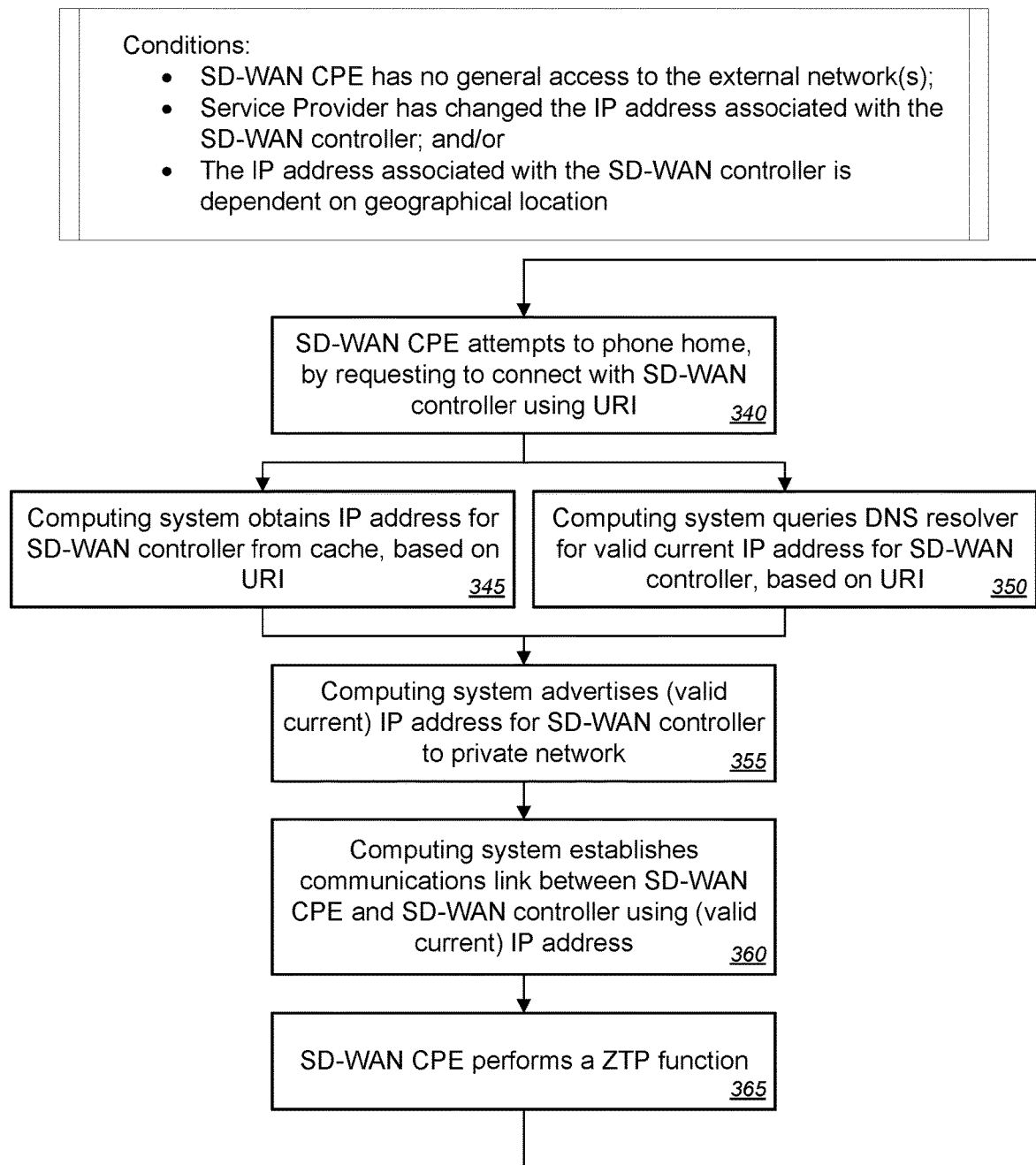
Figure 3C:
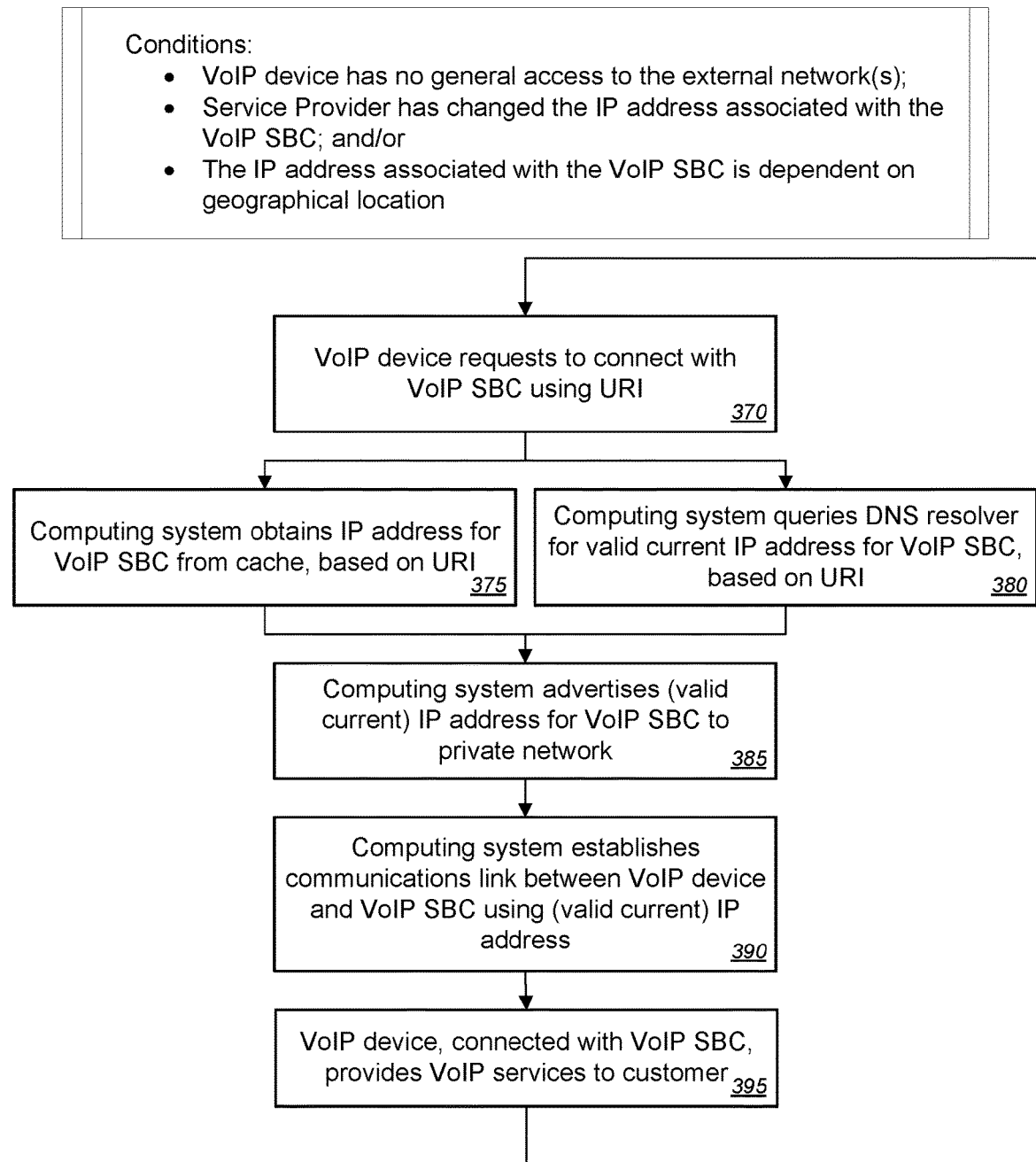

FIGS. 3A-3C (collectively, "FIG. 3") is a schematic diagram illustrating various non-limiting examples 300, 300', and 300" of use cases (including, but not limited to, licensing (FIG. 3A), zero touch provisioning ("ZTP") server reachability (FIG. 3B), or voice over IP ("VoIP") session border controller ("SBC") reachability (FIG. 3C), or the like) for which dynamic BGP host route generation based on DNS resolution may be implemented, in accordance with various embodiments.

Increasingly, software and/or hardware vendors are programming "phone home" capabilities into end nodes for various reasons, such as reaching external devices including, but not limited to, licensing servers, software update servers, ZTP servers, VoIP SBCs, or management servers, and/or the like. In some instances, these types of ends nodes often may be placed or disposed into a customer's private multiprotocol label switching ("MPLS") network (e.g., a managed entity, or the like), where the customer's MPLS virtual routing and forwarding ("VRF") system may or may not have actual Internet connectivity or a default route. The various embodiments provide techniques for enabling a node within a customer's private MPLS VRF to send traffic (e.g., a "phone home" communication, or the like) to an entity on the Internet (or external private network, or the like) when the customer's VRF does not have Internet access, or where there is or is not a default route, or when the entity's IP address changes over time, or the like.

With reference to the non-limiting embodiment 300 of FIG. 3A, a licensing use case may include, without limitation, one or more of the following conditions: (a) a third party device embodied by a user device (similar to user devices 115a-115n or private host 215 of FIG. 1 or 2, or the like) located within a private network (similar to private network(s) 120 and 220 of FIGS. 1 and 2, or the like) has no general access to an external network(s) (similar to external network(s) 135 and 235 of FIGS. 1 and 2, or the like); (b) a third party (who is associated with the third party device and a third party licensing server embodied by the external device (similar to external network(s) 135 and 235 of FIGS. 1 and 2, or the like)) has changed the Internet Protocol ("IP") address associated with the third party licensing server; or (c) the IP address associated with the third party licensing server is dependent on geographical location; and/or the like.

At block 305, the third party device may attempt to "phone home" (i.e., to establish a communications link with the third party licensing server via the external network(s), or the like), by requesting to connect with the third party licensing server using a uniform resource identifier ("URI") indicative of a network location of the third party licensing server. A computing system (similar to computing systems 105 and 205 of FIGS. 1 and 2, or the like) may either (1) obtain the IP address for the third party licensing server from a cache (similar to cache 110 or 210 of FIG. 1 or 2, or the like) based on the URI (block 310) or (2) query a domain name system ("DNS") server or resolver (similar to DNS server 145 or DNS resolver 245 of FIG. 1 or 2, or the like) for a valid current IP address for the third party licensing server, based on the URI (block 315).

The computing system may advertise the (valid current) IP address for the third party licensing server to the private network (block 320). At block 325, the computing system may establish a communications link between the third party device and the third party licensing server using the (valid current) IP address. The third party device may register its serial number and may obtain up-to-date license information from the third party licensing server (block 330). At block 335, the third party licensing server may initiate and/or may track billing of the license. The process may return to block 305, and the processes at blocks 305-335 may be repeated.

For example, managed customer premises equipment ("mCPE") router that is placed or disposed at a customer premises may be used to route traffic from the customer's on-premises local area network ("LAN") to private destinations within the customer's VRF across the customer's MPLS network. This mCPE Router may be configured to "phone home" to a license server on the Internet, the license server being associated with the third party vendor that provides the mCPE router (e.g., based on URI such as, but not limited to, "cpelicence.YYYYYY.com" or the like, where "YYYYYY" denotes the domain name associated by the third party), or the like. By "phoning home," the mCPE router may register its serial-number and may obtain or update a license(s) (including, but not limited to, at least one of a feature license, a function license, or a bandwidth ("BW") license, and/or the like), and, in some cases, may also initiate or track billing of that license to the service provider providing services to the customer using the third party mCPE router. The service provider could implement a dynamic BGP host route generation based on DNS name resolution techniques, in accordance with the various embodiments, on a firewall or router (which is associated with, and/or operated by, the service provider) that is attached to the customer's VRF. As the firewall or router BGP session may be constantly or periodically announcing the correct and/or most-up-to-date IP address of the third party license server (e.g., "cpelicense.YYYYYY.com=IP 5.6.7.8" or the like) into the Customer's MPLS VRF, then the mCPE can always 'phone-home' to the third party license server, to stay properly licensed. This method may be performed whether or not the customer's VRF actually has a default-route to the Internet, as the third license server host IP is advertised by the service provider firewall or router into the Customer's VRF. Since the service provider firewall or router may be periodically resolving "cpelicense.YYYYYY.com" to "IP address x.y.z.w," it allows the third party to change the IP address in the future, such that the service provider's personnel would not need to touch or change any route or BGP policies on the service provider firewall or router or on the mCPE. This technique may also work in situations where the resolved IP address is dependent on geographical location. For example, in North America, the license server may resolve to "5.6.7.8," while, in Europe, the Middle East, and Africa ("EMEA"), the license server may resolve to "14.15.16.17," and so on.

Turning to the non-limiting embodiment 300' of FIG. 3B, a ZTP server reachability use case may include, but is not limited to, one or more of the following conditions: (a) a software defined wide area network ("SD-WAN") customer premises equipment ("CPE") embodied by a user device (similar to user devices 115a-115n or private host 215 of FIG. 1 or 2, or the like) located within a private network (similar to private network(s) 120 and 220 of FIGS. 1 and 2, or the like) has no general access to an external network(s) (similar to external network(s) 135 and 235 of FIGS. 1 and 2, or the like); (b) a service provider (who is associated with the SD-WAN CPE and a SD-WAN controller embodied by the external device (similar to external network(s) 135 and 235 of FIGS. 1 and 2, or the like) or who operates services associated with the private network and/or the external network) has changed the Internet Protocol ("IP") address associated with the SD-WAN controller; or (c) the IP address associated with the SD-WAN controller is dependent on geographical location; and/or the like.

At block 340, the SD-WAN CPE may attempt to "phone home" (i.e., to establish a communications link with the SD-WAN controller via the external network(s), or the like), by requesting to connect with the SD-WAN controller using a uniform resource identifier ("URI") indicative of a network location of the SD-WAN controller. A computing system (similar to computing systems 105 and 205 of FIGS. 1 and 2, or the like) may either (1) obtain the IP address for the SD-WAN controller from a cache (similar to cache 110 or 210 of FIG. 1 or 2, or the like) based on the URI (block 345) or (2) query a domain name system ("DNS") server or resolver (similar to DNS server 145 or DNS resolver 245 of FIG. 1 or 2, or the like) for a valid current IP address for the SD-WAN controller, based on the URI (block 350).

The computing system may advertise the (valid current) IP address for the SD-WAN controller to the private network (block 355). At block 360, the computing system may establish a communications link between the SD-WAN CPE and the SD-WAN controller using the (valid current) IP address. The SD-WAN CPE may perform a ZTP function (block 365). The process may return to block 340, and the processes at blocks 340-365 may be repeated.

For example, the service provider could provide a SD-WAN CPE(s) (whether manufactured by the service provider or by a third party, or the like) within a customer's MPLS VRF provided by the service provider, where the SD-WAN CPE(s) may need to "phone home" to a SD-WAN controller hosted by the service provider to perform a ZTP function. The service provider may configure the SD-WAN CPE to "phone home" to the resolved IP address of the controller DNS name (e.g., "ztpsdwan.ZZZZZZ.net" or the like, where "ZZZZZZ" denotes the domain name associated by the service provider). This technique need not rely on the presence of a default route to the Internet within the customer's VRF, and may also dynamically change the BGP advertisement of the controller IP, if the service provider changes it in the future.

Referring to the non-limiting embodiment 300" of FIG. 3C, a VoIP SBC reachability use case may include, without limitation, one or more of the following conditions: (a) a VoIP device embodied by a user device (similar to user devices 115a-115n or private host 215 of FIG. 1 or 2, or the like) located within a private network (similar to private network(s) 120 and 220 of FIGS. 1 and 2, or the like) has no general access to an external network(s) (similar to external network(s) 135 and 235 of FIGS. 1 and 2, or the like); (b) a third party (who is associated with the VoIP device and a VoIP SBC embodied by the external device (similar to external network(s) 135 and 235 of FIGS. 1 and 2, or the like)) has changed the Internet Protocol ("IP") address associated with the VoIP SBC; or (c) the IP address associated with the VoIP SBC is dependent on geographical location; and/or the like.

At block 370, the VoIP device may request to connect with the VoIP SBC using a uniform resource identifier ("URI") indicative of a network location of the VoIP SBC. A computing system (similar to computing systems 105 and 205 of FIGS. 1 and 2, or the like) may either (1) obtain the IP address for the VoIP SBC from a cache (similar to cache 110 or 210 of FIG. 1 or 2, or the like) based on the URI (block 375) or (2) query a domain name system ("DNS") server or resolver (similar to DNS server 145 or DNS resolver 245 of FIG. 1 or 2, or the like) for a valid current IP address for the VoIP SBC, based on the URI (block 380).

The computing system may advertise the (valid current) IP address for the VoIP SBC to the private network (block 385). At block 390, the computing system may establish a communications link between the VoIP device and the VoIP SBC using the (valid current) IP address. The VoIP device, connected with the VoIP SBC, may provide VoIP services to the customer associated with the VoIP device (block 395). The process may return to block 370, and the processes at blocks 370-395 may be repeated.

For example, the service provider may provide a VoIP product within a customer's MPLS VRF provided by the service provider, where the VoIP product requires connectivity to a SBC (e.g., a VoIP SBC hosted by the service provider, or the like) to offer VoIP services to the customer. The service provider may configure the premises VoIP product (e.g., an integrated access device ("IAD"), an enterprise SBC ("eSBC"), or an IP private branch exchange ("IP-PBX"), or the like) to the resolved IP address of the service provider SBC (e.g., "sbc.denver.ZZZZZZ.net" or the like, where "ZZZZZZ" denotes the domain name associated by the service provider). This technique need not rely on the presence of a default route to the Internet within the customer's VRF, and may also dynamically change the BGP advertisement of the LUMEN SBC, if the service provider changes it in the future.

FIGS. 4A-4F (collectively, "FIG. 4") are flow diagrams illustrating a method 400 for implementing dynamic BGP host route generation based on DNS resolution, in accordance with various embodiments. Method 400 of FIG. 4A continues onto FIG. 4B following the circular marker denoted, "A," returns from each of FIGS. 4B, 4D, 4E, and 4F to FIG. 4A following the circular marker denoted, "B," returns from each of FIGS. 4B, 4C, 4D, 4E, and 4F to FIG. 4B following the circular marker denoted, "C," continues onto FIG. 4C from FIG. 4A or FIG. 4B following the circular marker denoted, "D," returns from each of FIGS. 4C and 4F to FIG. 4A following the circular marker denoted, "E," continues onto FIG. 4D from FIG. 4A following the circular marker denoted, "F," continues onto FIG. 4E from FIG. 4A following the circular marker denoted, "G," and continues onto FIG. 4F from FIG. 4A following the circular marker denoted, "H."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, 300', and 300" of FIGS. 1, 2, 3A, 3B, and 3C, respectively (or components thereof), such methods may also be implemented using any suitable hardware (or software) implementation. Similarly, while each of the systems, examples, or embodiments 100, 200, 300, 300', and 300" of FIGS. 1, 2, 3A, 3B, and 3C, respectively (or components thereof), can operate according to the method 400 illustrated by FIG. 4 (e.g., by executing instructions embodied on a computer readable medium), the systems, examples, or embodiments 100, 200, 300, 300', and 300" of FIGS. 1, 2, 3A, 3B, and 3C can each also operate according to other modes of operation and/or perform other suitable procedures.

Figure 4A:
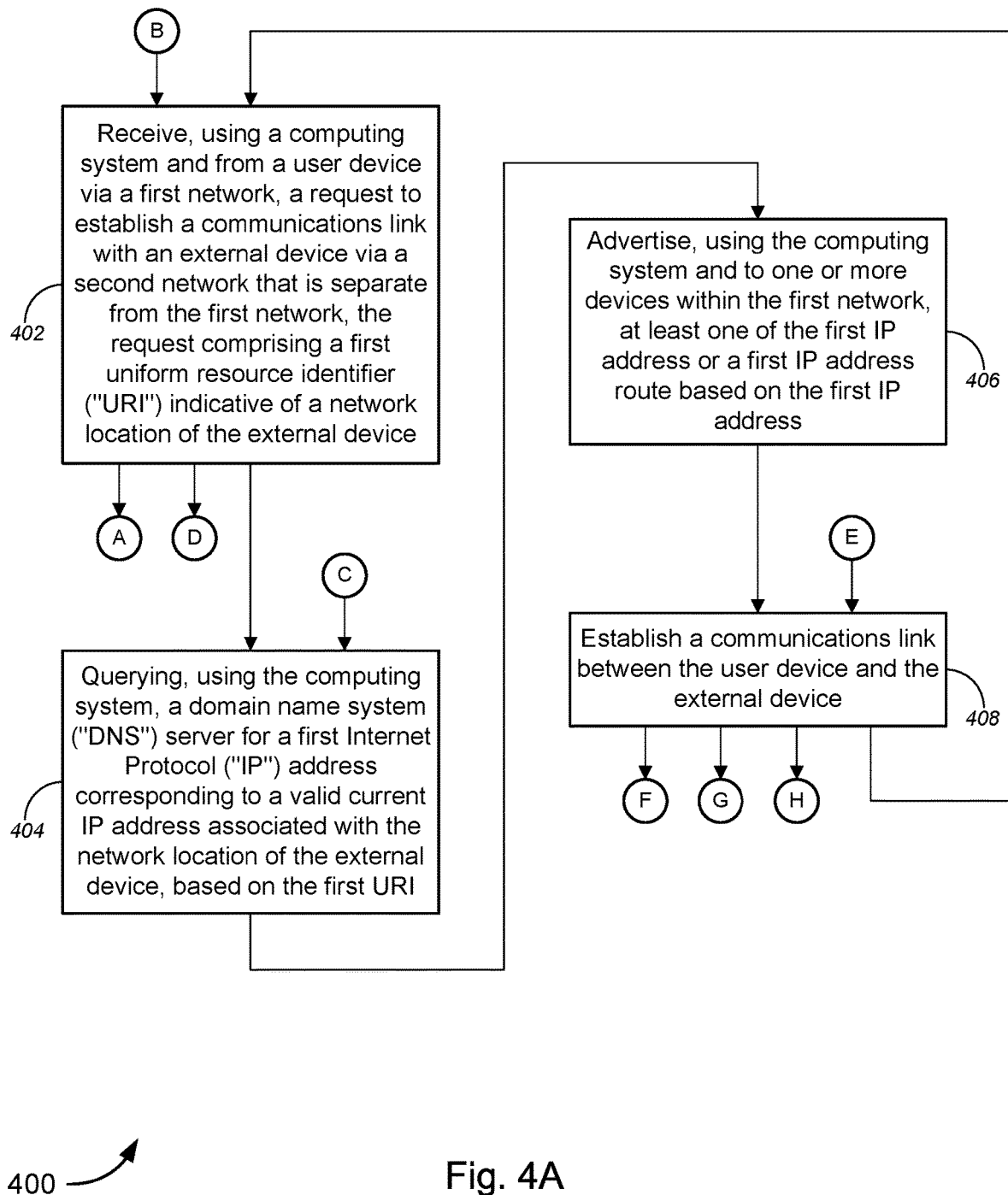

In the non-limiting embodiment of FIG. 4A, method 400, at block 402, may comprise receiving, using a computing system and from a user device via a first network, a request to establish a communications link with an external device via a second network that is separate from the first network.

In some instances, the request may include, but is not limited to, a first uniform resource identifier ("URI") indicative of a network location of the external device. In some embodiments, the computing system may include, without limitation, at least one of a firewall device, a router device, a gateway device, a network interface device, an optical network terminal, or customer premises equipment, and/or the like. In some cases, the external device may include, but is not limited to, one of software update server, a management server, a licensing server (e.g., a licensing server associated with the service provider of the external network(s), a third party licensing server, or the like), a software defined wide area network ("SD-WAN") controller, or a voice over Internet Protocol ("VoIP") session border controller ("SBC"), and/or the like.

Method 400 may continue onto the process at block 404, the process at block 410 in FIG. 4B following the circular marker denoted, "A," and/or the process at block 412 in FIG. 4C following the circular marker denoted, "D."

At block 404, method 400 may comprise querying, using the computing system, a domain name system ("DNS") server for a first Internet Protocol ("IP") address corresponding to a valid current IP address associated with the network location of the external device, based on the first URI. In some instances, querying the DNS server for the first IP address may comprise one of continuously, periodically, randomly, or reactively querying, using the computing system, the DNS server for the first IP address corresponding to the valid current IP address associated with the network location of the external device. Method 400 may further comprise, at block 406, advertising, using the computing system and to one or more devices within the first network, at least one of the first IP address or a first IP address route based on the first IP address. In some cases, the one or more devices within the first network may include the user device. In some instances, advertising the at least one of the first IP address or the first IP address route based on the first IP address may comprise advertising, using the computing system and to the one or more devices within the first network, at least one of the first IP address or the first IP address route based on the first IP address, using border gateway protocol ("BGP"). According to some embodiments, querying the DNS and advertising the at least one of the first IP address or the first IP address route may be performed in real-time or near-real-time.

At block 408, method 400 may comprise establishing a communications link between the user device and the external device.

Figure 4F:
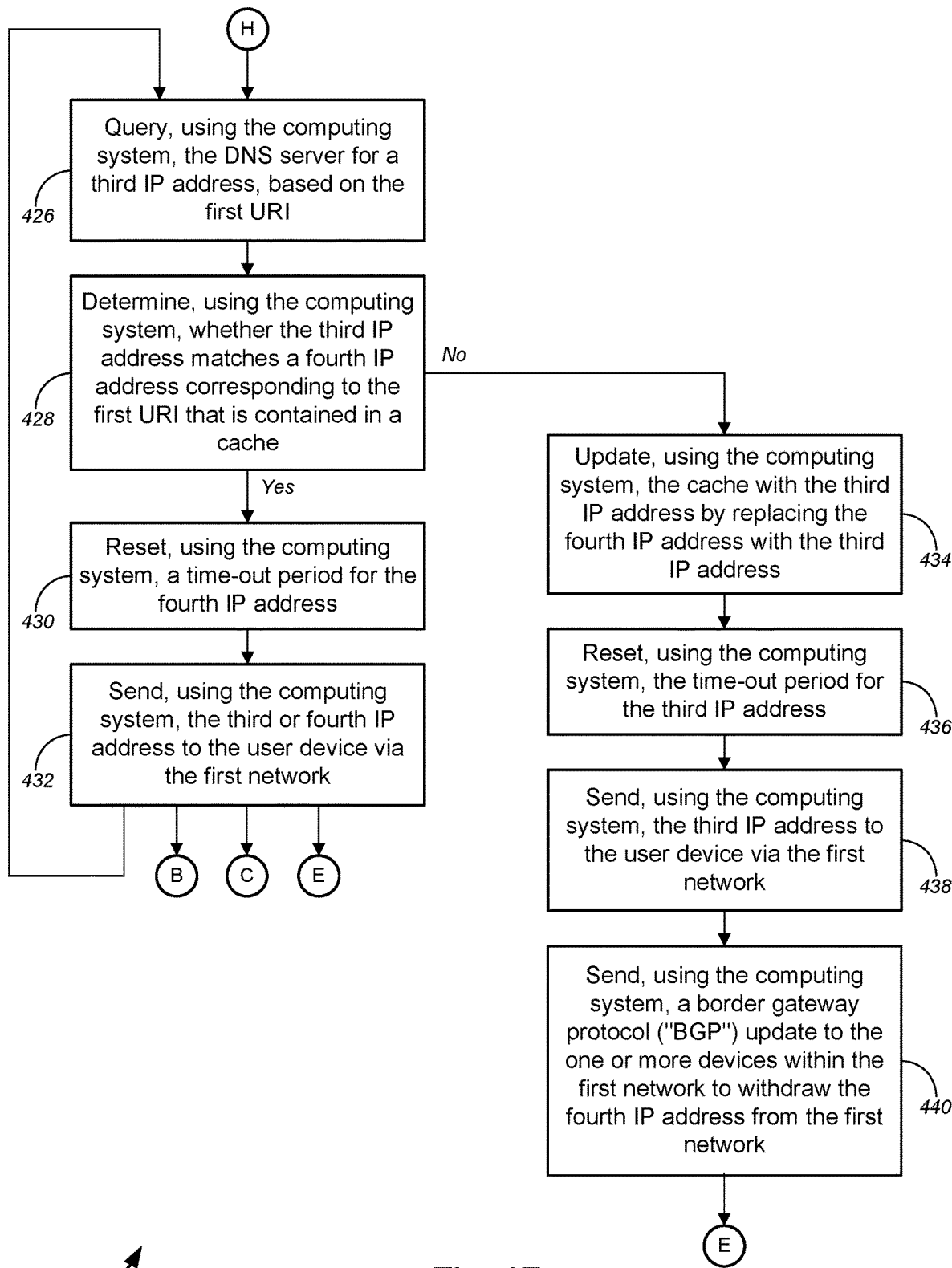

Method 400 may return to the process at block 402, may continue onto the process at block 416 in FIG. 4D from FIG. 4A following the circular marker denoted, "F," may continue onto the process at block 420 in FIG. 4E from FIG. 4A following the circular marker denoted, "G," and/or may continue onto the process at block 426 in FIG. 4F from FIG. 4A following the circular marker denoted, "H."

At block 410 in FIG. 4B (following the circular marker denoted, "A," in FIG. 4A), method 400 may comprise, in response to receiving the request, from the user device, to establish a communications link with an external device, determining, using the computing system, whether the first URI is whitelisted, by comparing at least one of the first URI or a domain name portion of the first URI with at least one of a fully qualified domain name ("FQDN") or a partial domain name contained within a whitelist in a database. In some instances, querying the DNS server for the first IP address corresponding to a valid current IP address associated with the network location of the external device, based on the first URI, may only be performed based on a determination that the first URI is whitelisted. In some cases, the cache may store a plurality of fully qualified domain names ("FQDNs") and corresponding IP addresses, wherein all said corresponding IP addresses may be advertised into the first network. Based on a determination that the first URI has not been whitelisted, method 400 may return to the process at block 402 in FIG. 4A following the circular marker denoted, "B." Based on a determination that the first URI has been whitelisted, method 400 may return to the process at block 404 in FIG. 4A following the circular marker denoted, "C," or may continue onto the process at block 412 in FIG. 4C following the circular marker denoted, "D."

At block 412 in FIG. 4C (following the circular marker denoted, "D," in FIG. 4A or 4B), method 400 may comprise, in response to receiving the request to establish a communications link with the external device via the second network, determining, using the computing system, whether a second IP address, which corresponds to the first URI and which is stored in a cache that is communicatively coupled to the computing system, is a valid current IP address associated with the network location of the external device. If not, method 400 may return to the process at block 404 in FIG. 4A following the circular marker denoted, "C." If so, method 400 may continue onto the process at block 414.

At block 414, method 400 may comprise advertising, using the computing system and to one or more devices within the first network, at least one of the second IP address or a second IP address route based on the first IP address. In some embodiments, querying the DNS server for the first IP address corresponding to a valid current IP address associated with the network location of the external device, based on the first URI, may be performed based on a determination that the second IP address is not a valid current IP address associated with the network location of the external device.

Method 400 may return to the process at block 408 in FIG. 4A following the circular marker denoted, "E."

At block 416 in FIG. 4D (following the circular marker denoted, "F," in FIG. 4A), method 400 may comprise, after a user configurable time-out period for each FQDN contained in the cache, removing, using the computing system, said FQDN and corresponding IP address from the cache. Method 400 may further comprise, at block 418, sending, using the computing system, a border gateway protocol ("BGP") update to the one or more devices within the first network to withdraw said IP address that corresponds to the FQDN from the first network. In some cases, the configurable time-out period may be reset when a FQDN and corresponding IP address is added or updated in the cache.

Method 400 may return to the process at block 402 in FIG. 4A following the circular marker denoted, "B," or the process at block 404 in FIG. 4A following the circular marker denoted, "C."

At block 420 in FIG. 4E (following the circular marker denoted, "G," in FIG. 4A), method 400 may comprise, after a user configurable refresh period for each FQDN contained in the cache, querying, using the computing system, the DNS server for a current valid IP address corresponding to each FQDN. Method 400 may further comprise replacing, using the computing system, the IP address corresponding to said FQDN in the cache with the corresponding current valid IP address (block 422), and resetting, using the computing system, the configurable refresh period (block 424).

Method 400 may return to the process at block 402 in FIG. 4A following the circular marker denoted, "B," or the process at block 404 in FIG. 4A following the circular marker denoted, "C."

With reference to FIG. 4F (following the circular marker denoted, "H," in FIG. 4A), method 400 may comprise performing a cache update, comprising: querying, using the computing system, the DNS server for a third IP address, based on the first URI (block 426); and determining, using the computing system, whether the third IP address matches a fourth IP address corresponding to the first URI that is contained in a cache (block 428). If so, method 400 may continue onto the process at block 430. If not, method 400 may continue onto the process at block 434.

At block 430, method 400 may comprise, based on a determination that the third IP address obtained from the DNS server matches the fourth IP address that is contained in the cache, resetting, using the computing system, a time-out period for the fourth IP address. Method 400, at block 432, may comprise sending, using the computing system, the third or fourth IP address to the user device via the first network.

Method 400 may return to the process at block 426, may return to the process at block 402 in FIG. 4A following the circular marker denoted, "B," the process at block 404 in FIG. 4A following the circular marker denoted, "C," or the process at block 408 in FIG. 4A following the circular marker denoted, "E."

At block 434, method 400 may comprise, based on a determination that the third IP address obtained from the DNS server is different from the fourth IP address contained in the cache, updating, using the computing system, the cache with the third IP address by replacing the fourth IP address with the third IP address. Method 400 may further comprise resetting, using the computing system, the time-out period for the third IP address (block 436), sending, using the computing system, the third IP address to the user device via the first network (block 438), and sending, using the computing system, a border gateway protocol ("BGP") update to the one or more devices within the first network to withdraw the fourth IP address from the first network (block 440).

Method 400 may return to the process at block 408 in FIG. 4A following the circular marker denoted, "E."

Exemplary System and Hardware Implementation

Figure 5:
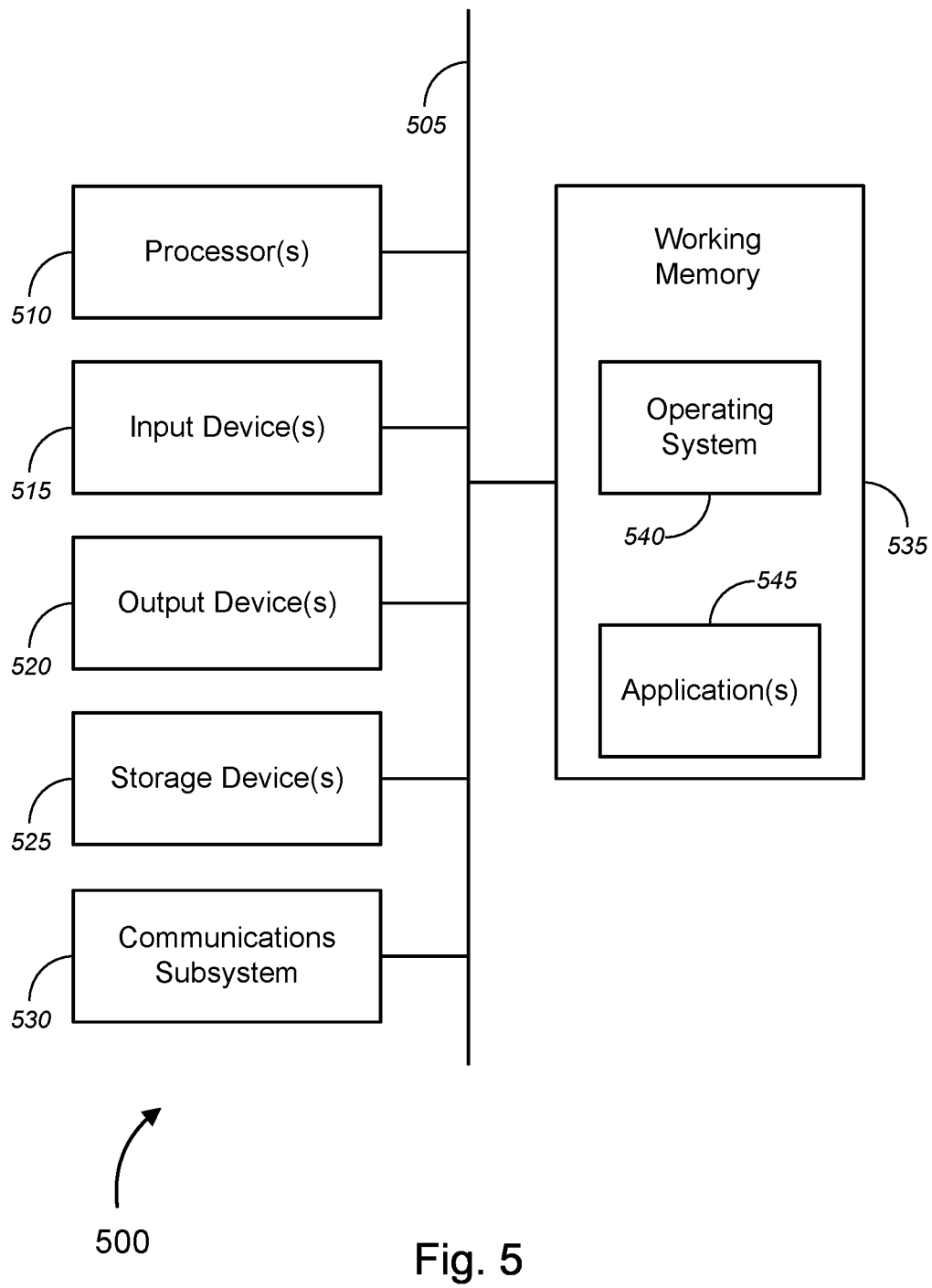
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105 and 205, user devices 115a-115n, private host 215, external devices 130 and 230, and domain name system ("DNS") server or resolver 145 and 245, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105 and 205, user devices 115a-115n, private host 215, external devices 130 and 230, and DNS server or resolver 145 and 245, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
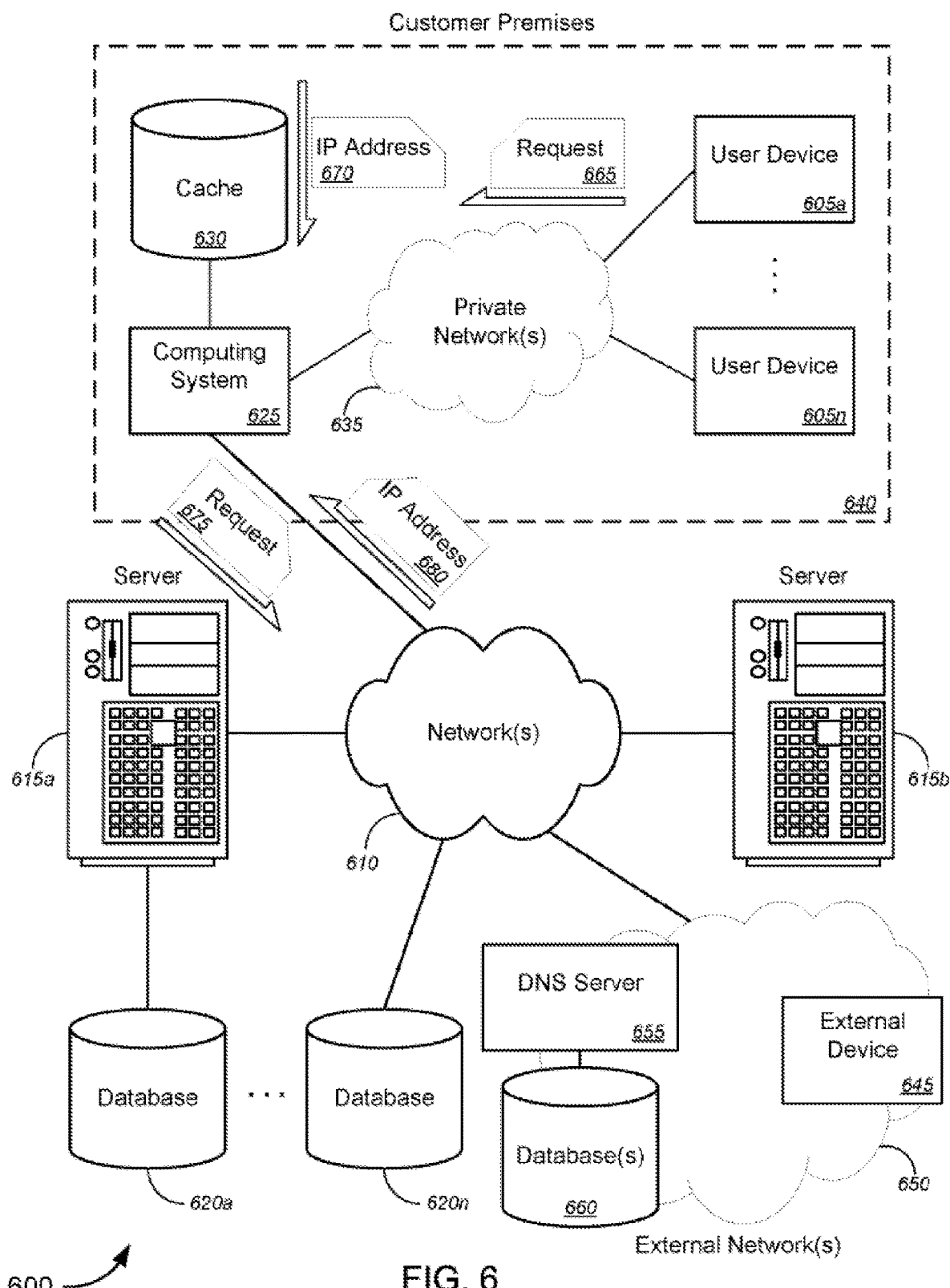
FIG. 6 is a block diagram illustrating a networked system of computers, computing systems, or system hardware architecture, which can be used in accordance with various embodiments.

As noted above, a set of embodiments comprises methods and systems for implementing network routing, and, more particularly, to methods, systems, and apparatuses for implementing dynamic border gateway protocol ("BGP") host route generation based on domain name system ("DNS") resolution. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 120, 135, 220, and 235 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing network routing, and, more particularly, to methods, systems, and apparatuses for implementing dynamic BGP host route generation based on DNS resolution, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105 and 205 of FIGS. 1 and 2, or the like), cache 630 (similar to cache 110 or 210 of FIG. 1 or 2, or the like), and private network(s) 635 (similar to private network(s) 120 and 220 of FIGS. 1 and 2, or the like). User devices 605a-605n (collectively, "user devices 605," or the like; similar to user devices 115a-115n or private host 215 of FIG. 1 or 2, or the like), computing system 625, cache 630, and private network(s) 635 may be disposed within customer premises 640 (similar to customer premises 125 of FIG. 1, or the like). System 600 may further comprise external device 645 (similar to external devices 130 and 230 of FIGS. 1 and 2, or the like), external network(s) 650 (similar to external network(s) 135 and 235 of FIGS. 1 and 2, or the like), domain name system ("DNS") server or resolver 655 and corresponding database(s) 660 (similar to DNS server 145 or DNS resolver 245 and corresponding database(s) 150 or 250 of FIG. 1 or 2, or the like).

In operation, a computing system (e.g., computing system 625, or the like) may receive, from a user device (e.g., one of user devices 605*a* or 605*b*, or the like) via a first network (e.g., private network(s) 635, or the like), a request (e.g., request 665, or the like) to establish a communications link with an external device (e.g., external device 645, or the like) via a second network (e.g., external network(s) 650, or the like) that is separate from the first network, the request comprising a first uniform resource identifier ("URI") indicative of a network location of the external device. The computing system may query a DNS server or resolver (e.g., DNS server 655, or the like) for a first Internet Protocol ("IP") address (e.g., IP address 680, or the like) corresponding to a valid current IP address associated with the network location of the external device, based on the first URI, e.g., by sending a request (e.g., request 675, which is either a forwarded request 665 or a request similar to request 665 or based on request 665, or the like). In some embodiments, querying the DNS server for the first IP address may comprise one of continuously, periodically, randomly, or reactively querying the DNS server for the first IP address corresponding to the valid current IP address associated with the network location of the external device.

The computing system may then advertise, to one or more devices within the first network (including the user device), at least one of the first IP address or a first IP address route based on the first IP address. According to some embodiments, advertising the at least one of the first IP address or the first IP address route based on the first IP address may comprise advertising, to the one or more devices within the first network, at least one of the first IP address or the first IP address route based on the first IP address, using border gateway protocol ("BGP") or the like. In some instances, querying the DNS and advertising the at least one of the first IP address or the first IP address route may be performed in real-time or near-real-time. The computing system and/or the second network (or nodes, routers, or switches therein) may subsequently establish a communications link between the user device and the external device based on the at least one of the first IP address or the first IP address route (which may be determined by the computing system and/or the second network (or nodes, routers, or switches therein), or the like).

In some embodiments, in response to receiving the request, from the user device, to establish a communications link with an external device, the computing system may determine whether the first URI is whitelisted, in some cases, by comparing at least one of the first URI or a domain name portion of the first URI with at least one of a fully qualified domain name ("FQDN") or a partial domain name contained within a whitelist in a database (e.g., cache 630, or other database(s) (not shown), or the like). In such embodiments, querying the DNS server for the first IP address corresponding to a valid current IP address associated with the network location of the external device, based on the first URI, may be only performed based on a determination that the first URI is whitelisted.

Alternatively, or additionally, in response to receiving the request to establish a communications link with the external device via the second network, the computing system may determine whether a second IP address, which corresponds to the first URI and which is stored in a cache (e.g., cache 630, or the like) that is communicatively coupled to the computing system, is a valid current IP address associated with the network location of the external device. Based on a determination that the second IP address (e.g., IP address 670, or the like) is a valid current IP address associated with the network location of the external device, the computing system may advertise, to the one or more devices within the first network, at least one of the second IP address or a second IP address route based on the first IP address. In such embodiments, querying the DNS server for the first IP address corresponding to a valid current IP address associated with the network location of the external device, based on the first URI, may be performed based on a determination that the second IP address is not a valid current IP address associated with the network location of the external device. According to some embodiments, the cache may store a plurality of FQDNs and corresponding IP addresses, and, in one or more particular embodiments, all said corresponding IP addresses may be advertised into the first network.

Alternatively, or additionally, after a user configurable time-out period for each FQDN contained in the cache, the computing system may remove said FQDN and corresponding IP address from the cache, and may send a BGP update to the one or more devices within the first network to withdraw said IP address that corresponds to the FQDN from the first network. In such cases, the configurable time-out period may be reset when a FQDN and corresponding IP address is added or updated in the cache, or the like. In some embodiments, the configurable time-out period may be configured by a user or a customer to be any suitable time-out period, including, but not limited to, 1, 2, 3, 4, 5, 10, 15, 20, 25, 30, 35, 40, 45, 50, or 55 minutes or a range of 1-60 minutes, or 1, 2, 3, 4, 5, 6, 10, 11, 12, 15, 18, 21, 24, 30, 36, 42, or 48 hours, or a range of 1-48 hours, or 1, 2, 3, 4, 5, 6, 7 days, or a range of 1-7 days, or any suitable combination of days, hours, minutes, or the like. Thus, the time-out period may represent (based on user configuration) how long a previously obtained FQDN and corresponding IP address is deemed valid (or trustworthy), before it is deleted or removed from the cache.

Alternatively, or additionally, after a user configurable refresh period for each FQDN contained in the cache, the computing system may query the DNS server for a current valid IP address corresponding to each FQDN, may replace the IP address corresponding to said FQDN in the cache with the corresponding current valid IP address, and may reset the configurable refresh period. In some embodiments, the configurable refresh period may be configured by a user or a customer to be any suitable refresh period, including, but not limited to, 1, 2, 3, 4, 5, 10, 15, 20, 25, 30, 35, 40, 45, or 55 minutes or a range of 1-60 minutes, or 1, 2, 3, 4, 5, 6, 10, 11, 12, 15, 18, 21, 24, 36, 42, or 48 hours, or a range of 1-48 hours, or 1, 2, 3, 4, 5, 6, 7 days, or a range of 1-7 days, or any suitable combination of days, hours, minutes, or the like. Thus, the refresh period may represent (based on user configuration) how often the DNS server should be queried for an up-to-date or valid current IP address corresponding to the FQDN to replace the FQDN and corresponding IP address stored in the cache (regardless of whether or not the user device actively attempts to "phone home" to the external device, and regardless of the time-out period, or the like).

Alternatively, or additionally, the cache may be updated any time a new DNS request is made, regardless of the time-out period, the refresh period, or the like.

Alternatively, or additionally, the computing system may perform a cache update, which may comprise: querying the DNS server for a third IP address, based on the first URI; determining whether the third IP address matches a fourth IP address corresponding to the first URI that is contained in a cache; based on a determination that the third IP address obtained from the DNS server matches the fourth IP address that is contained in the cache, resetting a time-out period for the fourth IP address, and sending the third or fourth IP address to the user device via the first network; and based on a determination that the third IP address obtained from the DNS server is different from the fourth IP address contained in the cache, updating the cache with the third IP address by replacing the fourth IP address with the third IP address, resetting the time-out period for the third IP address, sending the third IP address to the user device via the first network, and sending a BGP update to the one or more devices within the first network to withdraw the fourth IP address from the first network.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, using a computing system and from a user device via a first network, a request to establish a communications link with an external device via a second network that is separate from the first network, the request comprising a first uniform resource identifier ("URI") indicative of a network location of the external device;
    querying, using the computing system, a domain name system ("DNS") server for a first Internet Protocol ("IP") address corresponding to a valid current IP address associated with the network location of the external device, based on the first URI, and advertising, using the computing system and to one or more devices within the first network, at least one of the first IP address or a first IP address route based on the first IP address, wherein the one or more devices within the first network comprise the user device, wherein a communications link is established between the user device and the external device based on the at least one of the first IP address or the first IP address route; and
    performing a cache update, comprising:
        querying, using the computing system, the DNS server for a third IP address, based on the first URI;
        determining, using the computing system, whether the third IP address matches a fourth IP address corresponding to the first URI that is contained in a cache;
        based on a determination that the third IP address obtained from the DNS server matches the fourth IP address that is contained in the cache, resetting, using the computing system, a time-out period for the fourth IP address, and sending, using the computing system, the third or fourth IP address to the user device via the first network; and
        based on a determination that the third IP address obtained from the DNS server is different from the fourth IP address contained in the cache, updating, using the computing system, the cache with the third IP address by replacing the fourth IP address with the third IP address, resetting, using the computing system, the time-out period for the third IP address, sending, using the computing system, the third IP address to the user device via the first network, and sending, using the computing system, a border gateway protocol ("BGP") update to the one or more devices within the first network to withdraw the fourth IP address from the first network.

2. The method of claim 1, wherein the computing system comprises at least one of a firewall device, a router device, a gateway device, a network interface device, an optical network terminal, or customer premises equipment.

3. The method of claim 1, wherein querying the DNS server for the first IP address comprises one of continuously, periodically, randomly, or reactively querying, using the computing system, the DNS server for the first IP address corresponding to the valid current IP address associated with the network location of the external device.

4. The method of claim 1, wherein advertising the at least one of the first IP address or the first IP address route based on the first IP address comprises advertising, using the computing system and to the one or more devices within the first network, at least one of the first IP address or the first IP address route based on the first IP address, using border gateway protocol ("BGP").

5. The method of claim 1, wherein querying the DNS and advertising the at least one of the first IP address or the first IP address route is performed in real-time or near-real-time.

6. The method of claim 1, further comprising:
    in response to receiving the request, from the user device, to establish a communications link with an external device, determining, using the computing system, whether the first URI is whitelisted, by comparing at least one of the first URI or a domain name portion of the first URI with at least one of a fully qualified domain name ("FQDN") or a partial domain name contained within a whitelist in a database;
    wherein querying the DNS server for the first IP address corresponding to a valid current IP address associated with the network location of the external device, based on the first URI, is only performed based on a determination that the first URI is whitelisted.

7. The method of claim 1, wherein querying the DNS server for the first IP address corresponding to a valid current IP address associated with the network location of the external device, based on the first URI, is performed based on one of:
  a requirement for a third party device embodied by the user device to maintain a licensed state by periodically phoning home to a third party licensing server embodied by the external device, wherein the third party device and the third party licensing server are associated with a third party, wherein querying the DNS server and establishing the communications link between the user device and the external device are performed regardless of whether or not the third party device has general access to the second network, whether the third party has changed the IP address associated with the third party licensing server, or whether the IP address associated with the third party licensing server is dependent on geographical location;
  a requirement for a software defined wide area network ("SD-WAN") customer premises equipment ("CPE") embodied by the user device to initialize by phoning home at time of CPE setup or to periodically phone home to a SD-WAN controller embodied by the external device to perform a zero touch provisioning ("ZTP") function, wherein querying the DNS server and establishing the communications link between the user device and the external device are performed regardless of whether or not the SD-WAN CPE has general access to the second network, whether a service provider has changed the IP address associated with the SD-WAN controller, or whether the IP address associated with the SD-WAN controller is dependent on geographical location; or
  a requirement for a voice over IP ("VoIP") device embodied by the user device to continuously connect to a VoIP session border controller ("SBC") embodied by the external device to offer VoIP services to a customer, wherein querying the DNS server and establishing the communications link between the user device and the external device are performed regardless of whether or not the VoIP device has general access to the second network, whether a service provider has changed the IP address associated with the VoIP SBC, or whether the IP address associated with the VoIP SBC is dependent on geographical location.

8. The method of claim 7, wherein, for the user device without general access to the second network, the computing system provides the user device with access to the external device, via the second network, only to IP addresses or IP address routes advertised into the first network by the computing system.

9. A system, comprising:
  a computing system, comprising:
    at least one first processor; and
    a first non-transitory computer readable medium communicatively coupled to the at least one first processor, the first non-transitory computer readable medium having stored thereon computer software comprising a first set of instructions that, when executed by the at least one first processor, causes the computing system to:
      receive, from a user device via a first network, a request to establish a communications link with an external device via a second network that is separate from the first network, the request comprising a first uniform resource identifier ("URI") indicative of a network location of the external device;
      query a domain name system ("DNS") server for a first Internet Protocol ("IP") address corresponding to a valid current IP address associated with the network location of the external device, based on the first URI, and advertise, to one or more devices within the first network, at least one of the first IP address or a first IP address route based on the first IP address, wherein the one or more devices within the first network comprise the user device, wherein a communications link is established between the user device and the external device based on the at least one of the first IP address or the first IP address route; and
      performing a cache update, comprising:
        querying, using the computing system, the DNS server for a third IP address, based on the first URI;
        determining, using the computing system, whether the third IP address matches a fourth IP address corresponding to the first URI that is contained in a cache;
        based on a determination that the third IP address obtained from the DNS server matches the fourth IP address that is contained in the cache, resetting, using the computing system, a timeout period for the fourth IP address, and sending, using the computing system, the third or fourth IP address to the user device via the first network; and
        based on a determination that the third IP address obtained from the DNS server is different from the fourth IP address contained in the cache, updating, using the computing system, the cache with the third IP address by replacing the fourth IP address with the third IP address, resetting, using the computing system, the timeout period for the third IP address, sending, using the computing system, the third IP address to the user device via the first network, and sending, using the computing system, a border gateway protocol ("BGP") update to the one or more devices within the first network to withdraw the fourth IP address from the first network.

10. The system of claim 9, wherein the computing system comprises at least one of a firewall device, a router device, a gateway device, a network interface device, an optical network terminal, or customer premises equipment.

11. The system of claim 9, wherein querying the DNS server for the first IP address comprises one of continuously, periodically, randomly, or reactively querying, using the computing system, the DNS server for the first IP address corresponding to the valid current IP address associated with the network location of the external device.

12. The system of claim 9, wherein querying the DNS and advertising the at least one of the first IP address or the first IP address route is performed in real-time or near-real-time.

13. The system of claim 9, wherein querying the DNS server for the first IP address corresponding to a valid current IP address associated with the network location of the external device, based on the first URI, is performed based on one of:
  a requirement for a third party device embodied by the user device to maintain a licensed state by periodically phoning home to a third party licensing server embodied by the external device, wherein the third party device and the third party licensing server are associated with a third party, wherein querying the DNS server and establishing the communications link between the user device and the external device are performed regardless of whether or not the third party device has general access to the second network or whether the third party has changed the IP address associated with the third party licensing server;

a requirement for a software defined wide area network ("SD-WAN") customer premises equipment ("CPE") embodied by the user device to initialize by phoning home at time of CPE setup to a SD-WAN controller embodied by the external device to perform a zero touch provisioning ("ZTP") function, wherein querying the DNS server and establishing the communications link between the user device and the external device are performed regardless of whether or not the SD-WAN CPE has general access to the second network or whether a service provider has changed the IP address associated with the SD-WAN controller; or a requirement for a voice over IP ("VoIP") device embodied by the user device to continuously connect to a VoIP session border controller ("SBC") embodied by the external device to offer VoIP services to a customer, wherein querying the DNS server and establishing the communications link between the user device and the external device are performed regardless of whether or not the VoIP device has general access to the second network or whether a service provider has changed the IP address associated with the VoIP SBC.

14. The system of claim 13, wherein, for the user device without general access to the second network, the computing system provides the user device with access to the external device, via the second network, only to IP addresses or IP address routes advertised into the first network by the computing system.

* * * * *